United States Patent
Watanabe et al.

(10) Patent No.: US 8,716,888 B2
(45) Date of Patent: May 6, 2014

(54) VOLTAGE CONTROL APPARATUS, METHOD, AND PROGRAM

(75) Inventors: Kenichi Watanabe, Osaka (JP); Takahiro Kudoh, Kyoto (JP)

(73) Assignee: Panasonic Corporation, Osaka (JP)

( * ) Notice: Subject to any disclaimer, the term of this patent is extended or adjusted under 35 U.S.C. 154(b) by 105 days.

(21) Appl. No.: 13/511,710

(22) PCT Filed: Apr. 22, 2011

(86) PCT No.: PCT/JP2011/002394
§ 371 (c)(1),
(2), (4) Date: May 24, 2012

(87) PCT Pub. No.: WO2011/135822
PCT Pub. Date: Nov. 3, 2011

(65) Prior Publication Data
US 2012/0280673 A1 Nov. 8, 2012

(30) Foreign Application Priority Data
Apr. 27, 2010 (JP) ................................. 2010-102742

(51) Int. Cl.
*H02J 1/10* (2006.01)
(52) U.S. Cl.
USPC ........................................................ 307/42
(58) Field of Classification Search
USPC .................. 307/19, 24, 43, 69; 323/205, 304
See application file for complete search history.

(56) References Cited

U.S. PATENT DOCUMENTS

| | | | |
|---|---|---|---|
| 7,932,637 B2 * | 4/2011 | Lasseter et al. | 307/69 |
| 2010/0237834 A1 * | 9/2010 | Alonso Sadaba et al. | 323/205 |
| 2012/0153729 A1 * | 6/2012 | Song et al. | 307/82 |
| 2012/0310430 A1 * | 12/2012 | Black et al. | 700/293 |
| 2013/0035800 A1 * | 2/2013 | Kulathu et al. | 700/295 |
| 2013/0051103 A1 * | 2/2013 | Roscoe et al. | 363/131 |
| 2013/0082529 A1 * | 4/2013 | Wolter | 307/46 |
| 2013/0131878 A1 * | 5/2013 | Wilkins et al. | 700/287 |

FOREIGN PATENT DOCUMENTS

| | | |
|---|---|---|
| JP | 2002-171667 | 6/2002 |
| JP | 2006-121853 | 5/2006 |
| JP | 2007-288877 | 11/2007 |
| JP | 4266003 | 5/2009 |
| JP | 2009-239990 | 10/2009 |

OTHER PUBLICATIONS

International Search Report issued Aug. 2, 2011 in International (PCT) Application No. PCT/JP2011/002394.

(Continued)

*Primary Examiner* — Adolf Berhane
(74) *Attorney, Agent, or Firm* — Wenderoth, Lind & Ponack, L.L.P.

(57) ABSTRACT

The voltage control apparatus (202) includes: a first information obtaining unit (302) obtaining an output value of active power output from each of the distributed generations, and a voltage deviation amount or a voltage value at a point of common coupling of each of the distributed generations; and a control variable calculating unit (303) calculating a control variable corresponding to an amount of the active power or reactive power that should be changed and is to be output from each of the distributed generations to the distribution system so that the voltage deviation amount or the voltage value at one of the points of common coupling falls within a predetermined proper range in advance, wherein the control variable calculating unit calculates the control variable to be larger, as the output value of the active power output from one of the distributed generations is larger.

16 Claims, 16 Drawing Sheets

(56) References Cited

OTHER PUBLICATIONS

"Technical Requirements Guideline for Interconnection to Ensure Power Quality (denryoku hinshitsu kakuho ni kakaru keitou renkei gijyutsu youken guidorain)", Agency for Natural Resources and Energy, Japan, Oct. 1, 2004, with partial English translation.

"Development of a Distribution System Voltage Control Method for PV systems—A New Reactive Power Control Method for Voltage Rise Restraint-", Central Research Institute of Electric Power Industry (CRIERI), CRIERI Report, Japan, Jun. 2007, with partial English translation.

* cited by examiner

VOLTAGE CONTROL APPARATUS, METHOD, AND PROGRAM

TECHNICAL FIELD

The present invention relates to a voltage control apparatus, a voltage control method, and a voltage control program, and in particular, to a voltage control apparatus that calculates control variables for controlling a voltage of a distribution system interconnected to distributed generations.

BACKGROUND ART

In recent years, office buildings and houses have introduced distributed generations, such as solar power systems and fuel cells. The surplus electric power remaining after subtracting the power consumed by loads from the power generated by the distributed generations flows back to a distribution system, and is sold to electric power companies.

In order to achieve greater proliferation of the distributed generations, the Japanese government set, as a national policy, the target amounts of power generated from the newly introduced solar power system to 2.8 million kW in 2020, and 5.3 million kW in 2030. However, if a large number of distributed generations are interconnected to a distribution system and the surplus electric power flows back to the distribution system, it has been pointed out that the voltage may rise at points of common coupling and the voltage may be out of the appropriate voltage values for low voltage consumers (101±6V, 202±20V).

In order to prevent the voltage for the low voltage consumers from being out of the appropriate voltage values, the guideline established by the Ministry of Economy, Trade and Industry proposes a technique capable of automatically regulating a voltage by supplying the leading reactive power from the distributed generations or suppressing the active power to be output to the distributed generations, when it is likely that the voltage for the low voltage consumers is out of the appropriate voltage values due to the reverse power flow from the distributed generations (NPL 1).

However, when the larger number of distributed generations are introduced, under the guideline, the voltage tends to rise higher at a connection point closer to the end of the power distribution line and more distant from the distribution substation and the transformer. As a result, as a distributed generation is closer to the end of the power distribution line, the supplied value of the leading reactive power or the suppression value of the active power further increases (NPL 2).

In order to cope with the problems, for example, PTL 1 discloses the technique of (i) holding a voltage-controlled start threshold that is set to control the voltage to fall below a voltage upper limit value and that is set to a higher value as the interconnection position to the power distribution line is more distant from the starting position of the power distribution line, and (ii) controlling a voltage by supplying the leading reactive power when the voltage at a connection point exceeds the voltage-controlled start threshold. Accordingly, the surplus electric power can be sold to electric power companies almost in an equitable manner, regardless of the setting positions of the distributed generations.

PTL 2 discloses the technique of searching for a voltage deviation portion and controlling voltages at the distributed generations by collecting, using a monitoring control server, state data of a distribution system and operating data of the distributed generations and estimating the distribution of voltages of the distribution system. The technique allows suppressing variations between the distributed generations when the output power from the distributed generations is to be adjusted.

CITATION LIST

Patent Literature

[PTL 1] Japanese Patent No. 4266003
[PTL 2] Japanese Unexamined Patent Application Publication No. 2007-288877

Non Patent Literature

[NPL 1] "Technical requirements guideline for interconnection to ensure power quality" (denryoku hinshitsu kakuho ni kakaru keitou renkei gijyutsu youken guidorain), Agency of Natural Resources and Energy, Japan, Oct. 1, 2004.
[NPL 2] "Development of a Distribution System Voltage Control Method for PV systems—A New Reactive Power Control Method for Voltage Rise Restraint—", Central Research Institute of Electric Power Industry (CRIERI), CRIERI Report, Japan, June 2007.

SUMMARY OF INVENTION

Technical Problem

Although the conventional technique discloses equalizing the opportunity for each of the distributed generations to output an active power, it does not consider the load of controlling a voltage for supplying the leading reactive power. Thus, as the distributed generations are closer to the end of the power distribution line, the load of supplying the leading reactive power is larger. Furthermore, when the distributed generations are concentrated on a part of the power distribution line, part of the distributed generations has a larger load of supplying the leading reactive power.

Here, although the reactive power is indispensable to the power system operation and power system utilization, processing for supplying the reactive power needs an output waiting cost and an output cost of the reactive power, and a loss cost for the output opportunity of the active power. Thus, fairness in sharing the load of outputting the reactive power is important. Furthermore, currently, the output of the active power from each of the distributed generations is not considered, and the load of controlling a voltage for output is not equally shared.

The present invention has been conceived to solve the problems, and has an object of providing a voltage control apparatus that equally calculates supplied values of reactive power and output suppression values of active power, regardless of the setting positions of the distributed generations or concentrated distribution of the distributed generations.

Solution to Problem

In order to solve the conventional problems, a voltage control apparatus according to an aspect of the present invention includes: a first information obtaining unit configured to obtain a value of active power that is input and output to and from each of the distributed generations connected to a distribution system, and a voltage value or a voltage deviation amount from a predetermined proper range, at each of points of common coupling of the distributed generations; and a control variable calculating unit configured to calculate a control value corresponding to a value of active power or a value of reactive power that is to be input and output to and from each of the distributed generations so that a voltage value at one of the points of common coupling at which a voltage deviates from the predetermined proper range falls within the predetermined proper range; and a notification unit configured to notify the distributed generations of the control values calculated for the respective distributed generations, wherein the control variable calculating unit is configured to calculate the control values so that an amount of change in the value of the active power or the reactive power that is to be input and output to and from each of the distributed generations is larger as the value of the active power obtained by the first information obtaining unit is larger.

With this configuration, the voltage control apparatus controls the output of the reactive power in addition to the active power, according to the magnitude of the output value of the active power output from each of the distributed generations. Accordingly, it is possible to equally calculate supplied values of the reactive power and output suppression values of active power.

Furthermore, the first information obtaining unit may include: a local information obtaining unit configured to obtain the value of the active power that is input and output to and from a first distributed generation included in the distributed generations, and the voltage deviation amount or the voltage value at the point of common coupling of the first distributed generation; and a communication unit configured to (i) transmit, to a second distributed generation included in the distributed generations, the value of the active power that is input and output to and from the first distributed generation, and the voltage deviation amount or the voltage value at the point of common coupling of the first distributed generation, and (ii) receive, from a third distributed generation included in the distributed generations, the value of the active power that is input and output to and from the second distributed generation, and the voltage deviation amount or the voltage value at the point of common coupling of the second distributed generation, the output value, and the voltage deviation amount or the voltage value being obtained by the local information obtaining unit included in the second distributed generation.

With this configuration, the voltage control apparatus can obtain values of the active power output from the other distributed generations at all times, and equally calculate supplied values of the reactive power and output suppression values of active power according to the magnitude of the output value of the active power output from each of the distributed generations.

Furthermore, the voltage control apparatus may further include a second information obtaining unit configured to obtain a system impedance to a corresponding one of the distributed generations, wherein the control variable calculating unit may be configured to calculate the control values by multiplying, as a gain, a smaller one of the system impedance and a system impedance to the one of the points of common coupling at which the voltage deviates from the predetermined proper range by the amount of change in the value of the active power or the reactive power that is to be input and output between each of the distributed generations and the distribution system.

Furthermore, the second information obtaining unit may be configured to obtain a transmission voltage of a transformer, and the control variable calculating unit may be configured to calculate the control value so that the control value is larger in proportion to the transmission voltage.

With this configuration, the voltage control apparatus can equally calculate supplied values of the reactive power and output suppression values of active power according to the magnitude of the output value of the active power output from each of the distributed generations, regardless of the setting positions or uneven distribution of the distributed generations.

Furthermore, the voltage control apparatus may further include a system impedance estimating unit configured to estimate the system impedance to the distributed generation, wherein the system impedance estimating unit may be configured to inject harmonics to the distribution system, and calculate the system impedance, using a quotient obtained by dividing a harmonic voltage used when the harmonics are injected by a harmonic current of the injected harmonics so as to prevent the system impedance estimating units of the distributed generations from simultaneously calculating respective system impedances.

Furthermore, the system impedance estimating unit may be configured to change an amount of the active power or the reactive power that is output from each of the distributed generations, and calculate the system impedance, using a voltage variation according to the changed amount.

Furthermore, the system impedance estimating unit may be configured to inject harmonics to a power line, and calculate the system impedance, using a quotient obtained by dividing a harmonic voltage used when the harmonics are injected by a harmonic current of the injected harmonics.

With this configuration, the voltage control apparatus can equally calculate supplied values of the reactive power and output suppression values of active power, using an estimated value of the system impedance, even when it cannot obtain the system impedance using the second information obtaining unit.

Furthermore, the system impedance estimating unit may be configured to calculate the system impedance during a time period different for each of the distributed generations so as to prevent the system impedance estimating units of the distributed generations from simultaneously calculating respective system impedances.

With this configuration, the voltage control apparatus can accurately estimate the system impedance without interference of the processes for estimating the system impedance with one another.

Furthermore, the voltage control apparatus may further include a point of common coupling identifying unit configured to identify the one of the points of common coupling at which the distributed generations cause respective voltages to fall within the predetermined proper range, the points of common coupling being interconnected to the distributed generations, respectively.

Furthermore, the point of common coupling identifying unit may be configured to identify a point of common coupling at which the voltage deviation amount from the predetermined proper range is largest, as the one of the points of common coupling at which the distributed generations cause the respective voltages to fall within the predetermined proper range.

With this configuration, since controlling the voltage at the point of common coupling having the largest voltage deviation amount enables setting voltages at the other points of common coupling equal to or lower than the variable upper threshold, there is an advantage of controlling a voltage only once.

Furthermore, the point of common coupling identifying unit may be configured to identify a point of common coupling at which a voltage value has first deviated from the predetermined proper range, as the one of the points of common coupling at which the distributed generations cause the respective voltages to fall within the predetermined proper range.

With this configuration, there is an advantage of being able to immediately respond to the voltage deviation, and quickly start controlling the voltage.

Furthermore, the point of common coupling identifying unit may be configured to identify an area that includes a larger number of the points of common coupling at each of which a voltage value deviates from the predetermined proper range, and identify any one of the points of common coupling included in the area, as the one of the points of common coupling at which the distributed generations cause the respective voltages to fall within the predetermined proper range.

With this configuration, there are advantages of being able to quickly starting controlling the voltage and controlling the voltage a smaller number of times.

Furthermore, the control variable calculating unit may be configured to calculate the control values so that the voltage deviation amount or the voltage value at the one of the points of common coupling falls within the predetermined proper range, upon deviation of a voltage value at least one of the points of common coupling from the predetermined proper range, and start notifying the distributed generations of the control values.

With this configuration, after detecting deviation of the voltage value at one of the points of common coupling, it is possible to start controlling the voltage immediately.

Furthermore, the control variable calculating unit may be configured to calculate the control values of the active power or the reactive power to be smaller so that the voltage value at the one of the points of common coupling approximates a lower limit of the predetermined proper range, when (i) the control variable calculating unit calculates the control values for controlling the voltage value at the point of common coupling to be equal to or lower than an upper limit of the predetermined proper range, and (ii) the voltage value at the point of common coupling falls below the lower limit due to a voltage drop as a result of controlling the voltage value.

The configuration enables the appropriate restoration of the voltage drop caused by excessive control of the voltage at the points of common coupling by the voltage control apparatus, while the burden of the reactive power supply is equally shared and the output of active power is equally suppressed, regardless of the setting positions or uneven distribution of the distributed generations.

Furthermore, a distributed generation according to an aspect of the present invention may be a distributed generation connected to a distribution system, and including: an obtaining unit configured to obtain a value of active power that is input and output to and from the distributed generation, and a voltage deviation amount or a voltage value at a point of common coupling of the distributed generation; and a communication unit configured to transmit the value of the active power and the voltage deviation amount or the voltage value that are obtained by the obtaining unit, to the voltage control apparatus according to the aspect of the present invention, and receive a control value from the voltage control apparatus, wherein the distributed generation may change a value of active power to be input or output or a value of reactive power to be input or output, according to the control value.

With this configuration, the distributed generation can equally calculate supplied values of the reactive power and output suppression values of active power according to the magnitude of the output value of the active power output from each of the distributed generations, regardless of the setting positions or uneven distribution of the distributed generations, while suppressing the cost of the distributed generations installed at customers.

Advantageous Effects of Invention

As described above, under a circumstance where a plurality of distributed generations are interconnected to a distribution line, the present invention can provide a voltage control apparatus, a voltage control method, and a voltage control program for operating, in a coordinated manner, the distributed generations interconnected to the distribution line, and equally calculating supplied values of reactive power and output suppression values of active power, regardless of the setting positions or uneven distribution of the distributed generations.

DESCRIPTION OF EMBODIMENTS

Embodiments of the present invention will be described with reference to drawings.

Embodiment 1

Figure 1:
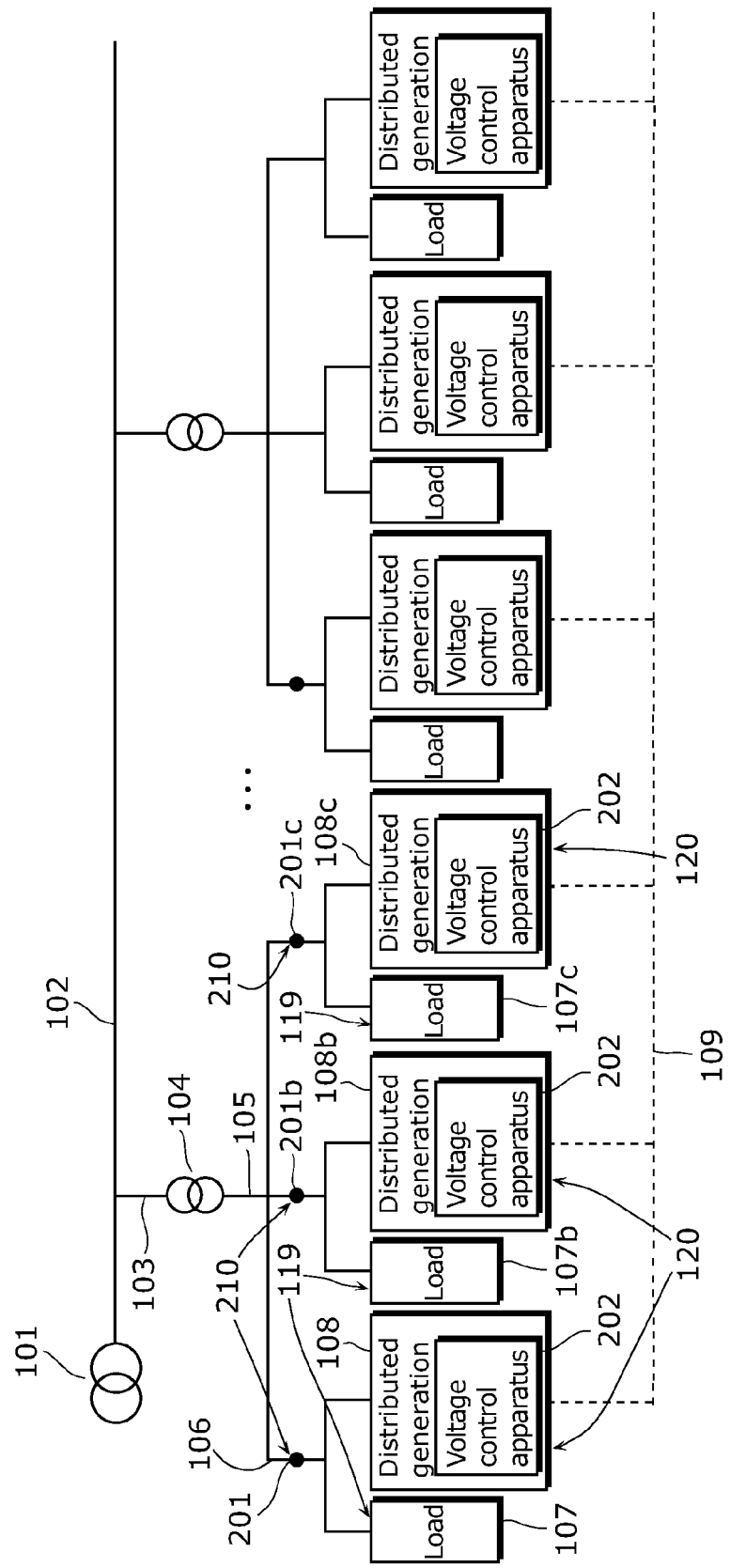
FIG. 1 illustrates a configuration of a distribution system according to Embodiments 1 and 2 of the present invention.

FIG. 1 illustrates a configuration of a distribution system according to Embodiment 1 of the present invention.

The distribution system is connected to a plurality of distributed generations 120 each including a voltage control apparatus 202 according to the present invention. The system includes a distribution substation 101, a high-voltage distribution line 102, a high-voltage drop wire 103, a pole-mounted transformer 104, a low-voltage distribution line 105, an service wire 106, loads 119, the distributed generations 120, a communication line 109, points of common coupling 210, and the voltage control apparatuses 202.

The solid arrows indicate the flow of (alternating-current hereinafter referred to as AC) power, and the dotted arrows indicate the flow of information.

The loads 119 that are a collective term are separately referred to as a load 107, a load 107b, and a load 107c.

Furthermore, the distributed generations 120 that are a collective term are separately referred to as a distributed generation 108, a distributed generation 108b, and a distributed generation 108c.

Furthermore, the points of common coupling 210 that are a collective term are separately referred to as a point of common coupling 201, a point of common coupling 201b, and a point of common coupling 201c.

The distribution substation 101 is a substation that supplies power from a higher-level power system (not illustrated) to the high-voltage distribution line 102.

The high-voltage distribution line 102 is an electric cable for power that distributes power supplied from the distribution substation 101 to the pole-mounted transformer 104.

The high-voltage drop wire 103 is an electric cable for power that connects the high-voltage distribution line 102 to the pole-mounted transformer 104. The high-voltage drop wire 103 delivers power from the high-voltage distribution line 102 to the pole-mounted transformer 104.

The pole-mounted transformer 104 is a transformer mounted on a pole for use. The pole-mounted transformer 104 converts the power distributed through the high-voltage distribution line 102 into a voltage appropriate for supplying low voltage consumers (a high voltage into a low voltage).

The low voltage consumers are, for example, general households. In FIG. 1, each of the low voltage consumers has any one of (i) the load 107 and the distributed generation 108, (ii) the load 107b and the distributed generation 108b, (iii) the load 107c and the distributed generation 108c, and others.

The low-voltage distribution line 105 is an electric cable for power that connects the pole-mounted transformer 104 to the service wire 106.

The service wire 106 is an electric cable for power that connects the low-voltage distribution line 105 to the loads 119 and the distributed generations 120. The service wire 106 delivers power from the low-voltage distribution line 105 to the loads 119. Furthermore, the service wire 106 delivers, to the power system, the surplus power that exceeds the power consumption of a corresponding one of the loads 119 out of the power generated by the distributed generation 120.

The power system herein is closer to a distribution substation for each of the low voltage consumers, and more specifically, closer to the high-voltage distribution line 102 with respect to the points of common coupling 210.

Each of the loads 119 is a load for a low voltage consumer. A set of loads in each household is, for example, the load 107, 107b, or 107c. Each of the loads 119 receives power supplied from the low-voltage distribution line 105 through the service wire 106. The loads 119 also receive power supplied from the distributed generations 120.

Each of the distributed generations 120 includes a power generator that generates power using natural energies, fossil fuels, storage batteries, and others as energy sources, and is a power source installed at each household and others. Each of the distributed generations 120 converts the generated direct-current (DC) power into the AC power, and causes the generated AC power to flow back to the system.

Although each of the low voltage consumers places the load 119 in parallel with the distributed generation 120, it may place only one of the load 119 and the distributed generation 120.

The communication line 109 is an information transmission medium for communication that connects the distributed generations 120 to each other. The distributed generations 120 transmit and receive various information through the communication line 109. The communication performed by the distributed generations 120 will be, for example, power line communication, optical communication, and wireless communication. The communication line 109 is, for example, an electric cable for power, an optical fiber, by radio, and others according to the communication. The communication performed by the distributed generations 120 and the communication line 109 are not limited to these.

The points of common coupling 210 are connection points (demarcation points) each of which connects the load 119 and the distributed generation 120 at each household, to the system through the service wire 106. In order to stabilize the supply of power, the appropriate voltage value is set to the point of common coupling 210. For example, the voltage value at the point of common coupling 210 when the standard voltage is 100 V needs to be controlled within 101±6V.

When the voltage value at one of the points of common coupling 210 is out of the appropriate voltage value, for example, the following measure needs to be taken for the corresponding distributed generation 120. In other words, until the distributed generation 120 reaches an appropriate value of a power factor (for example, 85%), it needs to supply the leading reactive power. Still when the voltage value at the point of common coupling 210 is out of the proper range, another measure needs to be taken, such as suppressing the active power that flows in reverse from the distributed generation 120.

The reason for distinguishing between the reactive power and the active power is that only the active power out of the power output from the distributed generations 120 is counted in the power selling price. When the power factor is equal to or larger than the appropriate value, the power selling price can be increased by limiting the voltage at the points of common coupling 210 within the proper range through increasing the output of the reactive power without reducing the output of the active power.

The distribution system in FIG. 1 described as an overhead distribution system is not limited to the one, but may be, for example, an underground distribution system, and thus is not limited to the distribution system and the electric system. More specifically, although the transformer used herein is a pole-mounted transformer, there is no need that the transformer is mounted on a pole. In the case of the underground distribution system, the transformer may be placed, for example, in an excavated hole or on the ground (pad mounted transformer).

Each of the voltage control apparatuses 202 will be described next with reference to FIGS. 2 and 3.

Figure 2:
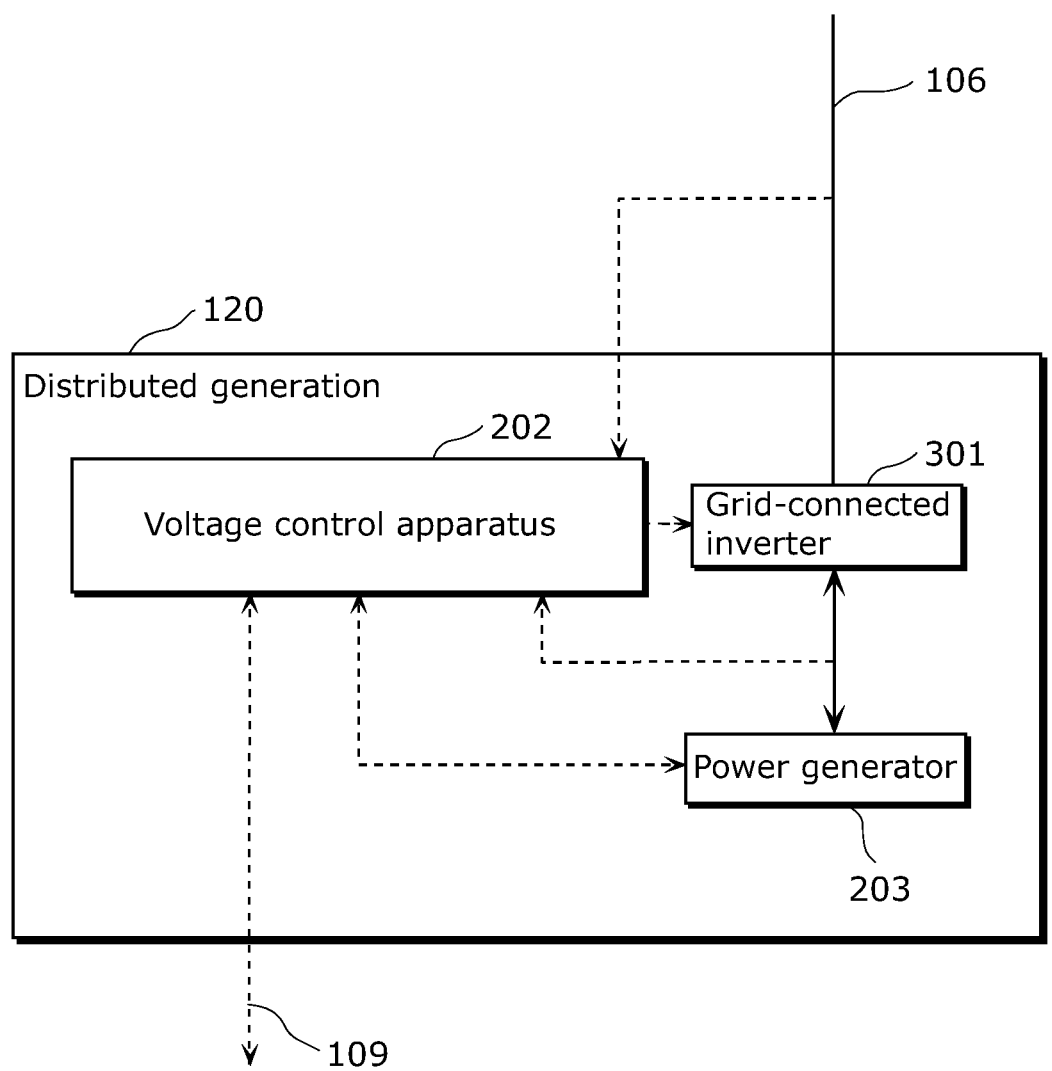
FIG. 2 illustrates a block diagram of a distributed generation according to Embodiments 1 and 2.

FIG. 2 illustrates a functional block diagram of the distributed generation 120 according to Embodiment 1. The same constituent elements as FIG. 1 are denoted by the same reference numerals, and the description thereof is omitted.

The distributed generation 120 according to Embodiment 1 includes the voltage control apparatus 202, a power generator 203, and a grid-connected inverter 301. As illustrated in FIG. 1, the solid arrows indicate the flow of (AC or DC) power, and the dotted arrows indicate the flow of information (for example, instructions or data).

The voltage control apparatus 202 includes an arithmetic processing unit, such as a Central Processing Unit (CPU), and calculates, using an equation to be described later, a control variable corresponding to an amount of power output from the distributed generation 120 that should be changed. More specifically, the voltage control apparatus 202 determines a supplied value of reactive power and an output suppression value of active power of each of the distributed generations 120. The values are necessary for limiting the voltage value at the point of common coupling 210 within the proper range. Here, the voltage control apparatus 202 determines a control variable so that each of the low voltage consumers equally shares the load, regardless of the positions or concentrated distribution of the distributed generations 120.

The voltage control apparatus 202 further controls the power generator 203, obtains an inner state of the power generator 203, obtains information of the power generated by the power generator 203, and exchanges information with the other voltage control apparatuses 202.

The power generator 203 is a power generator that generates AC or DC power. The power generator 203 that generates DC power is, for example, a solar power system, fuel cells, and a storage battery. The power generator 203 that generates AC power is, for example, a wind power system, a gas turbine, and a Diesel engine.

The grid-connected inverter 301 is, for example, a device for interconnecting a system, such as an AC generator for the wind power system and an electronic power inverter for the solar power system.

The grid-connected inverter 301 converts the output from the power generator 203 into the power in accordance with a grid-interconnection code or a guideline, and supplies the power to the load 119 or causes the power to flow back to the system. Furthermore, the grid-connected inverter 301 has a function for protecting interconnection in accordance with the grid-interconnection code, such as an islanding detection function.

Figure 3:
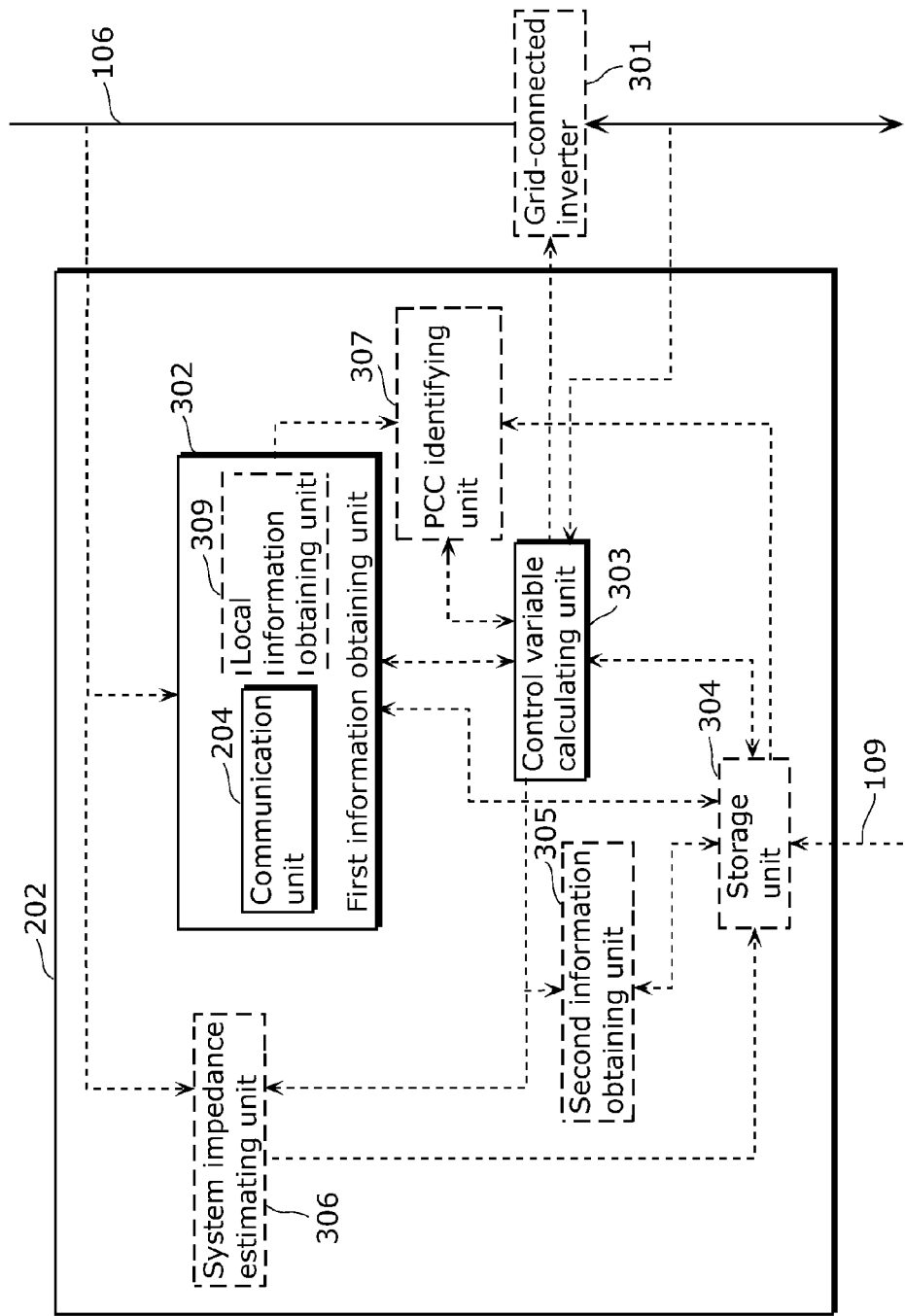
FIG. 3 illustrates a block diagram of a voltage control apparatus according to Embodiments 1 and 2.

FIG. 3 illustrates a functional block diagram of the voltage control apparatus 202 according to Embodiment 1. The same constituent elements as FIG. 2 are denoted by the same reference numerals, and the description thereof is omitted.

The voltage control apparatus 202 includes a first information obtaining unit 302, a control variable calculating unit 303, a storage unit 304, a second information obtaining unit 305, a system impedance estimating unit 306, and a PCC identifying unit 307. As illustrated in FIG. 2, the solid arrows indicate the flow of (AC or DC) power, and the dotted arrows indicate the flow of information.

The first information obtaining unit 302 is connected to the service wire 106, obtains, at regular intervals (for example, at intervals of one second), (i) an output value of active power output from each of the distributed generations 120 that operate in a coordinated manner to control respective voltage values at the points of common coupling 210 and (ii) a voltage deviation amount or a voltage value at each of the points of common coupling 210 of the distributed generations 120, and outputs the values and others to the control variable calculating unit 303. Furthermore, the first information obtaining unit 302 obtains, at regular intervals, a voltage, a phase, and a frequency at the point of common coupling 210 interconnected to the own distributed generation 120, a current value at the grid-connected inverter 301, and others, and outputs the information to the control variable calculating unit 303.

The control variable calculating unit 303 controls each of the grid-connected inverter 301, the first information obtaining unit 302, the storage unit 304, the second information obtaining unit 305, the system impedance estimating unit 306, and the PCC identifying unit 307.

More specifically, the control variable calculating unit 303 calculates a control variable corresponding to an amount of active power or reactive power that should be changed and is to be output from each of the distributed generations 120 that operate in a coordinated manner to a distribution system so that a voltage deviation amount or a voltage value at one of the points of common coupling 210 falls within a predetermined proper range, and notifies, of the control variables, the grid-connected inverters 301 included in the distributed generations 120. Here, as the output value of the active power output from each of the distributed generations 120 is larger, the control variable calculating unit 303 calculates a larger control variable. The details will be described later.

Furthermore, the control variable calculating unit 303 stores, in the storage unit 304, system information, local information, and others obtained by the first information obtaining unit 302 and the second information obtaining unit 305. Furthermore, the control variable calculating unit 303 issues, to the PCC identifying unit 307, an instruction for identifying one of the points of common coupling 210, and stores information on the identified point of common coupling 210 in the storage unit 304. Furthermore, the control variable calculating unit 303 retrieves the system information, the local information, and others from the storage unit 304. Furthermore, the control variable calculating unit 303 transmits an instruction on a sampling period to the first information obtaining unit 302 and the second information obtaining unit 305. Furthermore, the control variable calculating unit 303 transmits an instruction for obtaining the system information, to the second information obtaining unit 305 and the system impedance estimating unit 306 as necessary.

The storage unit 304 includes, for example, a semiconductor memory, such as a Read Only Memory (ROM) and a Random Access Memory (RAM). The storage unit 304 functions as a buffer for a communication unit 204 to obtain information of other distributed generations. Furthermore, the storage unit 304 stores information obtained by the first information obtaining unit 302 and the second information obtaining unit 305. Furthermore, the storage unit 304 is used for transmitting and receiving information in the voltage control apparatus 202.

The second information obtaining unit 305 obtains a voltage transmitted by the transformer in the distribution substation 101, a distance from the distribution substation 101, and others. Furthermore, the second information obtaining unit 305 obtains impedances of a transformer in the distribution substation 101, the pole-mounted transformer 104, the high-voltage distribution line 102, the low-voltage distribution line 105, and the service wire 106, and others.

The system impedance estimating unit 306 estimates a system impedance from the distribution substation 101 to each of the distributed generations 120 that operate in a coordinated manner, in response to an instruction from the control variable calculating unit 303. The estimation method will be described in detail later.

The PCC identifying unit 307 identifies the point of common coupling 210 at which the voltage is to fall within the proper range, among the points of common coupling 210 that are respectively interconnected to the distributed generations 120 that operate in the coordinated manner, when the control variable calculating unit 303 calculates the control variables. The identification method will be described in detail later.

Furthermore, the first information obtaining unit 302 includes the communication unit 204 and a local information obtaining unit 309.

The communication unit 204 is a communication interface for the external communication of the voltage control apparatus 202 through the communication line 109. More specifically, the communication unit 204 transmits, to the other distributed generations 120, the output value of the active power output from the distributed generation 120, and a voltage deviation amount or a voltage value at the own point of common coupling 210 of the distributed generation 120, all of which are obtained by the local information obtaining unit 309. Furthermore, the communication unit 204 receives, from each of the other distributed generations 120, the output value of the active power output from the distributed generation 120, and a voltage deviation amount or a voltage value at the point of common coupling 210 of the distributed generation 120, all of which are obtained by the local information obtaining unit 309 included in the distributed generation 120.

The local information obtaining unit 309 measures a voltage deviation amount from an appropriate voltage range or a voltage value at each of the points of common coupling 210 interconnected to the distributed generations 120 each including the local information obtaining unit 309, at regular intervals (for example, at intervals of one second), and outputs the measured amount or value to the control variable calculating unit 303. Furthermore, the local information obtaining unit 309 measures the output value, voltage, phase, and frequency of the active power output from the distributed generation 120, measures the current value of the grid-connected inverter 301 and others at regular intervals, and outputs the current value and others to the control variable calculating unit 303.

Although the grid-connected inverter 301 and the local information obtaining unit 309 are separated in the configuration of FIG. 3, the grid-connected inverter 301 may include the local information obtaining unit 309.

The voltage control apparatus 202 according to Embodiment 1 may be constructed only by the communication unit 204 and the control variable calculating unit 303 that are enclosed in solid lines among the constituent elements in FIG. 3.

For example, since the system information such as a system impedance is not frequently changed, the system impedance is defined in advance as a specific value, and is written and held in a ROM included in the control variable calculating unit 303 or the first information obtaining unit 302. Accordingly, the voltage control apparatus 202 according to the present invention can be implemented without the second information obtaining unit 305 and the system impedance estimating unit 306.

Furthermore, for example, the voltage control apparatus 202 can perform communication using a communication protocol in which information can be reliably resent or using a high-speed data line without using the storage unit 304 as a communication buffer. Furthermore, the control variable calculating unit 303 calculates the control variable of a voltage without storing the information in the storage unit 304, when each of the first information obtaining unit 302 and the second information obtaining unit 305 obtains new information at shorter intervals.

In such a case, the voltage control apparatus 202 according to the present invention can be implemented without using the storage unit 304 as a communication buffer.

Furthermore, when part of the distributed generations 120 does not generate power, the voltage control apparatus 202 included in the distributed generation 120 that does not generate power does not need to obtain the local information. Furthermore, the voltage control apparatus 202 is not necessarily included in each of the distributed generations 120. Here, one of the voltage control apparatuses 202 may obtain, from the other communication units 204, the power output from each of the distributed generations 120, and determine the control variables of the distributed generations 120.

Thus, the voltage control apparatus 202 according to the present invention can be implemented by including only the communication unit 204 in the first information obtaining unit 302, without the local information obtaining unit 309.

Furthermore, for example, when the distributed generation 120 has first detected that the voltage at the own point of common coupling 210 exceeds the appropriate value, it immediately informs the other distributed generations 120 from the communication unit 204 that the voltage at the own point of common coupling 210 should be controlled within the proper range.

In such a case, the voltage control apparatus 202 according to the present invention can be implemented without the PCC identifying unit 307.

Figure 4:
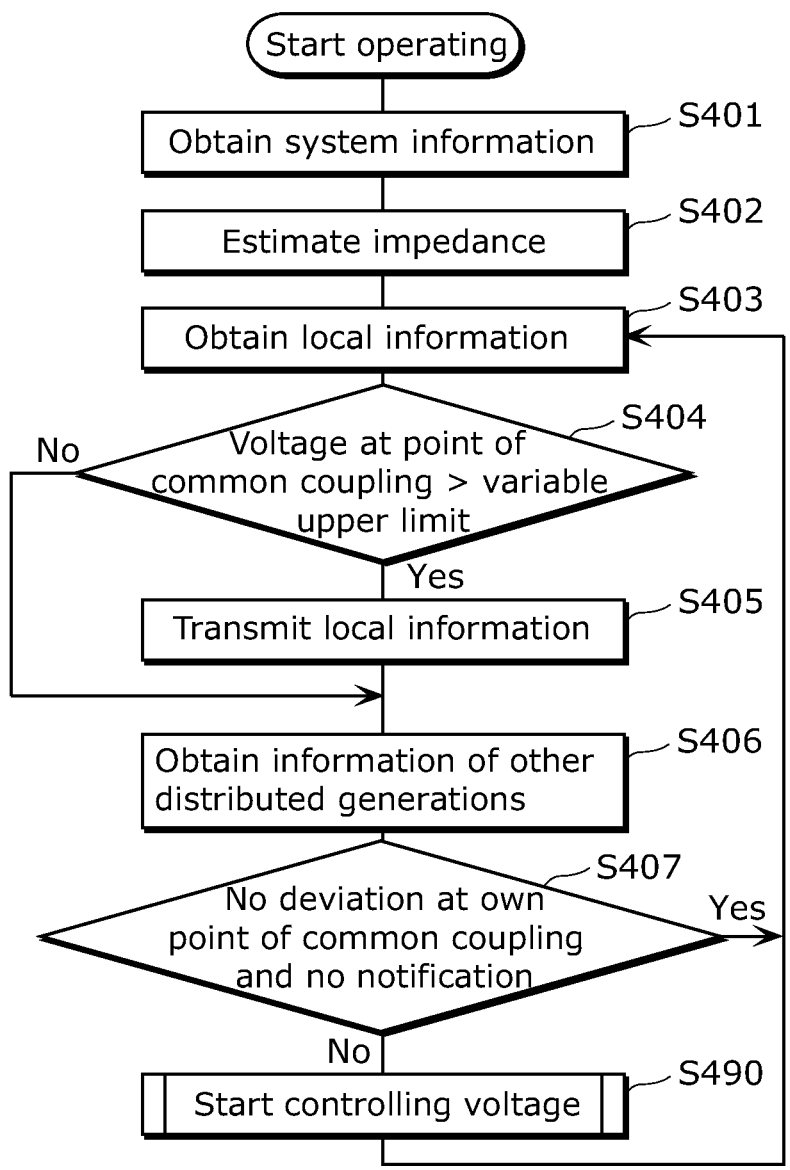
FIG. 4 is a flowchart indicating processes performed by a distributed generation that controls a voltage at a point of common coupling according to Embodiments 1 and 2.

FIG. 4 is a flowchart indicating a voltage control method performed by the distributed generations 120.

First, the control variable calculating unit 303 in each of the distributed generations 120 transmits the output value of the active power through the communication unit 204 to the other distributed generations 120 at regular intervals (for example, at intervals of 10 seconds), aside from the flowchart in FIG. 4 (for example, the occurrence of timer interrupt). The distributed generation 120 that receives the output value of the active power of each of the other distributed generations 120 stores the output value in the storage unit 304.

The second information obtaining unit 305 obtains information, such as a transmission voltage of the transformer in the distribution substation 101, impedances of the transformer in the distribution substation 101, the pole-mounted transformer 104, the high-voltage distribution line 102, the low-voltage distribution line 105, and the service wire 106, and a distance from the distribution substation 101 (S401).

The obtained information is, for example, stored in the storage unit 304.

Furthermore, when each of the distributed generations 120 obtains the system information (S401) and does not obtain any impedance value, the system impedance estimating unit 306 estimates a system impedance to the distributed generation 120 (S402).

Examples of a method of estimating the system impedance by the system impedance estimating unit 306 includes a method of calculating the system impedance by changing the output of the active power or the reactive power and measuring the voltage variation at that time using the system impedance estimating unit 306.

Furthermore, there is a method of injecting a harmonic current to the power system and calculating the system impedance using a quotient obtained by dividing the harmonic voltage at the time of injection by the injected harmonic current.

The system impedance estimating unit 306 stores the calculated impedance value in the storage unit 304.

Here, when the voltage control apparatuses 202 in FIG. 1 simultaneously estimate the impedances, there is a possibility that respective processes for estimating the system impedances performed by the voltage control apparatuses 202 interfere with one another. In such a case, each of the voltage control apparatuses 202 cannot accurately estimate the system impedance.

Here, the time division multiple access (TDMA) is introduced. In TDMA, a time slot (for example, 100 milliseconds) is allocated to each of the distributed generations 120, and each of the distributed generations 120 performs the impedance estimating process using the time slot. During the impedance estimating processes, the other distributed generations 120 do not perform the respective processes.

Each of the distributed generations 120 performs time synchronization using a time synchronization function (for example, Global Positioning System (GPS) and NTP (Network Time Protocol) so that all the distributed generations 120 on the high-voltage distribution line 102 share the same time. Accordingly, the overlapping of the time slots is prevented. Furthermore, the overlapping of the time slots is prevented with precision of the time synchronization function, by providing a guard time between the time slots.

In other words, the system impedance estimating unit 306 included in the voltage control apparatus 202 calculate the system impedance during a time period different for each of the distributed generations 120 so as to prevent the respective system impedance estimating units of the distributed generations 120 from simultaneously calculating respective system impedances.

Next, the local information obtaining unit 309 included in the first information obtaining unit 302 measures the output value of the active power output from the own distributed generation 120, and a voltage deviation amount or a voltage value at the point of common coupling 210 at regular intervals (for example, at intervals of one second), and transmits the local information to the control variable calculating unit 303 (S403).

Next, the control variable calculating unit 303 determines whether or not the voltage value measured by the local information obtaining unit 309 deviates from a variable upper limit (for example, 107 V) (S404).

As a result of the determination, when the voltage value deviates from the variable upper limit (Yes at S404), the control variable calculating unit 303 notifies the other distributed generations 120 of at least the voltage deviation amount or the voltage value from the variable upper limit using the communication unit 204 (S405).

On the other hand, when the voltage value does not deviate from the variable upper limit (No at S404), the control variable calculating unit 303 waits for a predetermined period until the communication unit 204 included in the first information obtaining unit 302 receives the notification about the voltage deviation amounts or the voltage values of the other distributed generations (S406).

The control variable calculating unit 303 determines whether or not the voltage needs to be controlled when the communication unit 204 receives a notification about receiving the information of the other distributed generations, or after a lapse of the predetermined time (S407). Here, the communication unit 204 obtains the output value of the active power of each of the other distributed generations 120 that is transmitted at regular intervals, and stores the output value in the own storage unit 304.

The control variable calculating unit 303 determines that the voltage need not be controlled, when the voltage at the own point of common coupling 210 does not deviate from the variable upper limit and the other distributed generations 120 do not notify respective voltage deviation amounts or voltage values (Yes at S407). As a result, the distributed generation 120 returns to the process for obtaining the local information by the second information obtaining unit 305 (S403).

On the other hand, the control variable calculating unit 303 starts controlling a voltage at the point of common coupling 210 corresponding to the distributed generation 120 that includes the control variable calculating unit 303 (S490) when the voltage deviates from the variable upper limit or the control variable calculating unit 303 receives the notification about the voltage deviation amount or the voltage value from each of the other distributed generations 120 (No at S407). The processes for controlling the voltage (S490) will be described with reference to FIG. 5.

Figure 5:
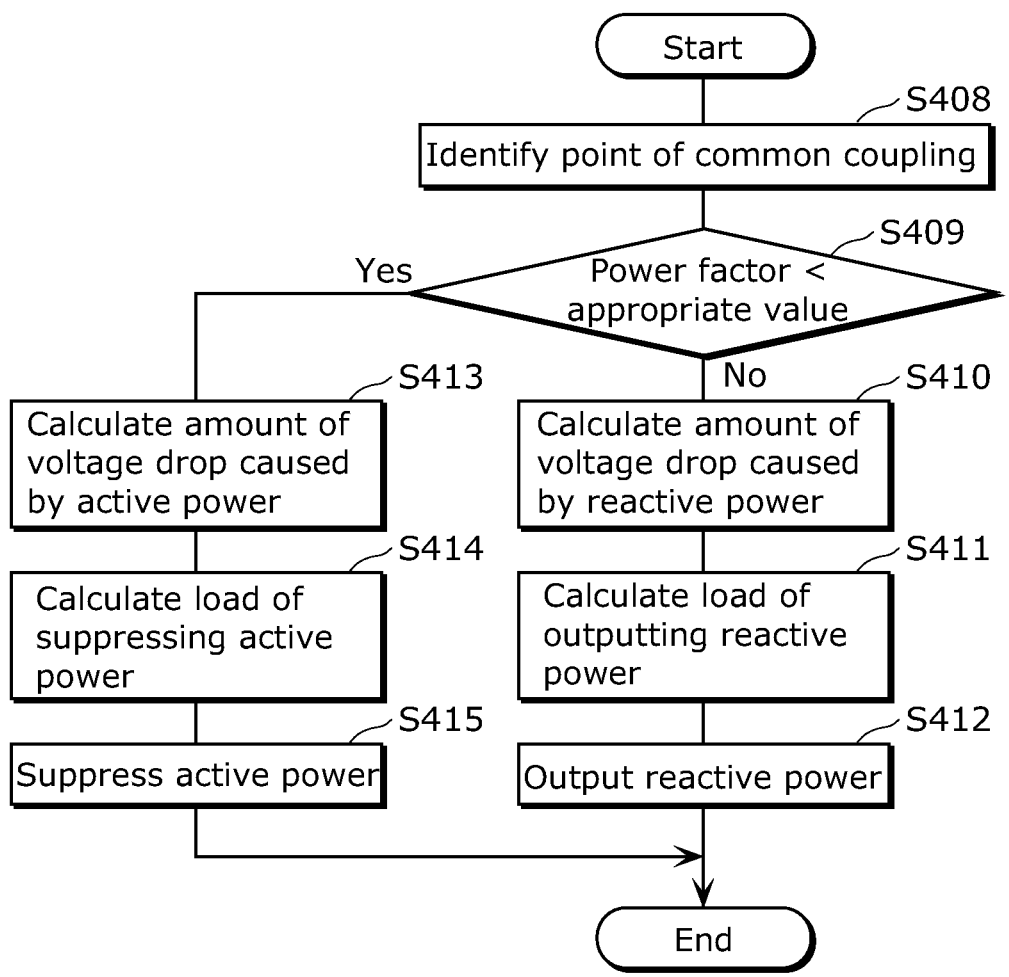
FIG. 5 is a flowchart indicating processes performed by a control variable calculating unit when a voltage at a point of common coupling rises according to Embodiments 1 and 2.

FIG. 5 is a flowchart indicating the procedure of calculating a voltage control variable when a voltage at the point of common coupling 210 rises according to Embodiment 1.

The PCC identifying unit 307 identifies the point of common coupling 210 that should be controlled by the distributed generation 120 so that the voltage falls within the proper range, among the points of common coupling 210 of the distributed generations 120 that operate in the coordinated manner (S408). Here, the PCC identifying unit 307 identifies one of the points of common coupling 210 using information of a voltage deviation amount or a voltage value at each of the points of common coupling 210 of the distributed generations 120. The information is received by the communication unit 204 included in the first information obtaining unit 302, from each of the other distributed generations 120 (S406 in FIG. 4).

There are a plurality of methods of identifying one of the points of common coupling 210 by the PCC identifying unit 307.

For example, one of the methods is a method of identifying the point of common coupling 210 at which the voltage value has the largest voltage deviation amount from the proper range, as the point of common coupling 210 at which the distributed generation 120 causes the voltage to fall within the proper range.

According to this method, since controlling the voltage at the point of common coupling 210 having the largest voltage deviation amount enables setting respective voltages at the other points of common coupling 210 equal to or lower than the variable upper limit, there is an advantage of controlling a voltage only once.

Furthermore, another method is identifying the point of common coupling 210 at which the voltage value has first deviated from the proper range, as the point of common coupling 210 at which the distributed generation 120 causes the voltage to fall within the proper range.

According to this method, there are advantages of being able to immediately respond to the voltage deviation, and quickly start controlling the voltage.

Furthermore, another method is identifying an area that includes a larger number of the points of common coupling 210 at each of which the voltage value deviates from the proper range, and identifying any one of the points of common coupling 210 included in this area as the point of common coupling 210 at which the distributed generation 120 causes the voltage to fall within the proper range.

This method is an intermediate method between the two methods, and there are advantages of being able to quickly starting controlling the voltage and controlling the voltage a smaller number of times.

There are various identification methods, and the methods are not limited.

There are a plurality of methods of identifying the "area that includes a larger number of the points of common coupling 210 at each of which the voltage value deviates from the proper range".

For example, when the points of common coupling 210 at each of which the voltage value deviates from the proper range are continued for more than a particular threshold, the continued points of common coupling 210 can be determined to be included in the "area that includes a larger number of the points of common coupling 210".

Furthermore, the points of common coupling 210 can be divided into two groups that are more distant from and closer to the distribution substation 101, and one of the groups that includes a larger number of the points of common coupling 210 at each of which the voltage value deviates can be determined to be included in the "area that includes a larger number of the points of common coupling 210".

Furthermore, the points of common coupling 210 of the distributed generations 120 that are connected to the same pole-mounted transformer are grouped into groups, and one of the groups that includes a larger number of the points of common coupling 210 can be determined as the "area that includes a larger number of the points of common coupling 210".

There are various methods of identifying the area, and the methods are not limited.

Next, the control variable calculating unit 303 determines whether or not the power factor at the point of common coupling 210 falls below the appropriate value (for example, 85%) (S409).

When the power factor is equal to or larger than the appropriate value (No at S409), the control variable calculating unit 303 calculates an amount of voltage drop caused by the output of the reactive power (S410).

More specifically, the control variable calculating unit 303 calculates the amount of voltage drop caused by the reactive power output from each of the distributed generations 120, at the identified point of common coupling 210 using Equation 1 (S410).

Here, $V_0$ denotes a transmission voltage of the transformer in the distribution substation 101. Furthermore, $\Delta V$ denotes a target amount of change in voltage at a corresponding one of the points of common coupling 210 at which the voltage is to be controlled. Furthermore, n denotes the number of the distributed generations 120 that are connected to the high-voltage distribution line 102. Furthermore, i denotes an identifier of the distributed generation 120 that is connected to the point of common coupling 210 at which the voltage is to be controlled. Furthermore, j denotes an identifier of each of the distributed generations, and has values ranging from 1 to n in close order from the distribution substation 101.

Furthermore, $d_j$ denotes a distance from the transformer in the distribution substation 101 to each of the distributed generations 120 identified by j. Furthermore, x denotes a value of a line reactance per unit length, and a product of x and $d_j$ determines a system impedance from the transformer in the distribution substation 101 to each of the distributed generations 120 identified by j.

Furthermore, $\Delta Q_j$ is an amount of change in the reactive power output from the distributed generations 120 identified by j (assuming the reactive power consumed by the load as a phase lag). In other words, $\Delta Q_j$ represents the control variable of each of the distributed generations 120 calculated by the control variable calculating unit 303.

In other words, Equation 1 is an equation for determining the amount of change in voltage $\Delta V$ at the point of common coupling 210 due to the output variation in the reactive power output from each of the distributed generations 120.

Here, the amount of change in voltage $\Delta V$ is determined so that the voltage value at the identified point of common coupling 210 falls within a predetermined proper range, that is, falls below the variable upper limit. In other words, $\Delta V=$ ((variable upper limit)−(voltage value at the identified point of common coupling 210)−α), where α is any real number equal to or larger than 0. Let a gain be an impedance with a smaller value $(\min(xd_j, xd_i))$ out of the system impedance "x×$d_j$" from the distribution substation 101 to the distributed generation 120 and the system impedance "x×$d_i$" from the distribution substation 101 to the identified point of common coupling 210, the control variable $\Delta Q_j$ is calculated in Equation 1 by multiplying the gain by the amount of change in the reactive power $\Delta Q_j$ output from the n distributed generations 120. In other words, as the distributed generation has the larger gain, the amount of the voltage drop at the point of common coupling 210 becomes larger according to the increase in the reactive power to be output.

Furthermore, Equation 1 is calculated so that the control variable $\Delta Q_j$ is larger in proportion to the transmission voltage $V_0$ of the distribution substation 101.

Next, the control variable calculating unit 303 calculates the load of outputting the reactive power from each of the distributed generations 120, using Equation 2 (S411).

Here, k denotes an identifier of any one of the n distributed generations 120, and ranges from 1 to n. Furthermore, $P_j$ denotes the active power output from each of the distributed generations 120 identified by the identifier j.

In other words, let k be the identifier of one of the distributed generations 120 that is arbitrarily selected, Equation 2 is an equation for determining the amount of change in the reactive power $\Delta Q_j$ output from each of the distributed generations 120, using the output value of the active power $P_k$ output from the distributed generation 120 identified by k and the amount of change in the reactive power $\Delta Q_k$ output from the distributed generation 120 identified by k.

In Equation 2, the control variable calculating unit 303 compares the output value of the active power $P_j$ output from the first distributed generation with the output value of the active power $P_k$ output from the second distributed generation, among the n distributed generations, and calculates the control variable $\Delta Q_j$ to be notified to the first distributed generation to be larger than the control variable $\Delta Q_k$ to be notified to the second distributed generation when the output value of the active power $P_j$ output from the first distributed generation is larger than the output value of the active power $P_k$ output from the second distributed generation ($P_j/P_k>1$).

Here, since j ranges integers from 1 to n (however, j≠k), Equation 2 is composed of (n−1) equations.

Thus, the control variable calculating unit 303 solves the system of equations of Equation 1 (1 equation) and Equation 2 ((n−1) equations), so as to obtain, as a control variable, the amount of change in the reactive power $\Delta Q_j$ output from each of the n distributed generations 120.

[Math 1]

$$\Delta V = -\frac{x}{V_0}\sum_{j=1}^{n}\min(d_j, d_i)\cdot \Delta Q_j \quad \text{(Equation 1)}$$

[Math 2]

$$\Delta Q_j = \frac{P_j}{P_k}\times \Delta Q_k \,(j=1,\ldots,n,\, j\neq k) \quad \text{(Equation 2)}$$

Next, processes performed by the control variable calculating unit 303 for calculating the load of outputting the reactive power from each of the distributed generation 120 (S410 to S411) will be specifically described with reference to FIGS. 6 to 9.

Figure 6:
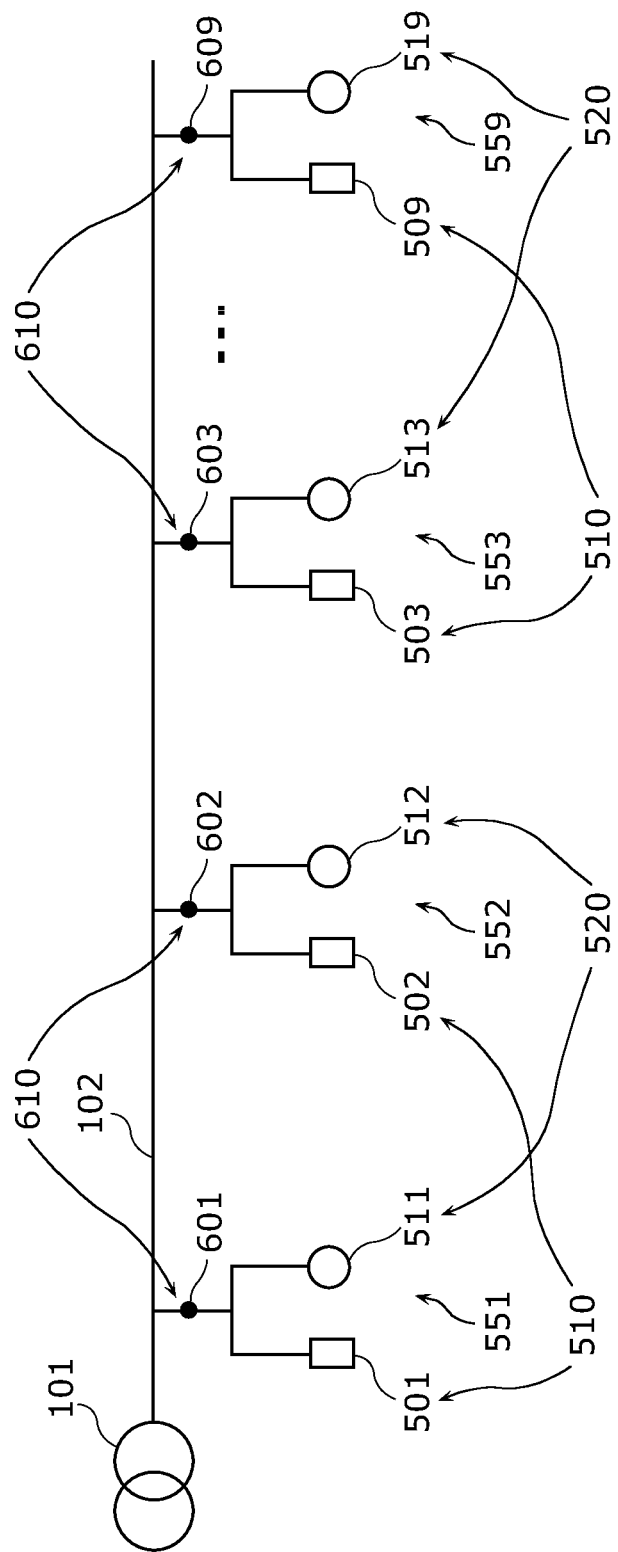
FIG. 6 illustrates a configuration of a distribution system (for high voltage) according to Embodiments 1 and 2.

FIG. 6 illustrates a configuration of a distribution system according to Embodiment 1. The same constituent elements as FIG. 1 are denoted by the common reference numerals, and the description thereof is omitted.

FIG. 6 is a simplified view by combining some of the loads 119 and the distributed generations 120 of the low voltage consumers in FIG. 1 to more easily understand the configuration.

In FIG. 6, each of loads 501 to 509 is obtained by combining some of the loads 119 of the low voltage consumers. For example, the load 501 in FIG. 6 is a combination of the loads 107, 107b, and 107c in FIG. 1.

Furthermore, each of distributed generations 511 to 519 is obtained by combining some of the distributed generations 120. For example, the distributed generation 511 in FIG. 6 is a combination of the distributed generations 108, 108b, and 108c in FIG. 1.

Furthermore, each of points of common coupling 601 to 609 is obtained by combining some of the points of common coupling 210. For example, the point of common coupling 601 in FIG. 6 is a combination of the points of common coupling 201, 201b, and 201c in FIG. 1.

For explanation, loads 510 are a collective term, and each of the loads 501 to 509 is an individual load. Furthermore, the distributed generations 520 are a collective term, and each of the distributed generations 511 to 519 is an individual distributed generation. Furthermore, points of common coupling 610 are a collective term, and each of the points of common coupling 601 to 609 is an individual point of common coupling.

Thus, high voltage consumers 551 to 559 include the loads 501 to 509 and the distributed generations 511 to 519, respectively.

Furthermore, the nine high voltage consumers 551 to 559 are interconnected to the power system through the points of common coupling 601 to 609, respectively, in the configuration of the distribution system according to Embodiment 1.

For explanation, let d1 to d9 distances be distances from the transformer in the distribution substation 101 to the high voltage consumers 551 to 559, respectively.

Furthermore, the distances d1 to d9 are simply referred to as distances 1 to 9. In other words, the distributed generations 511 to 519 are placed to be distant from the distribution substation 101 one by one by the distance 1.

Figure 7:
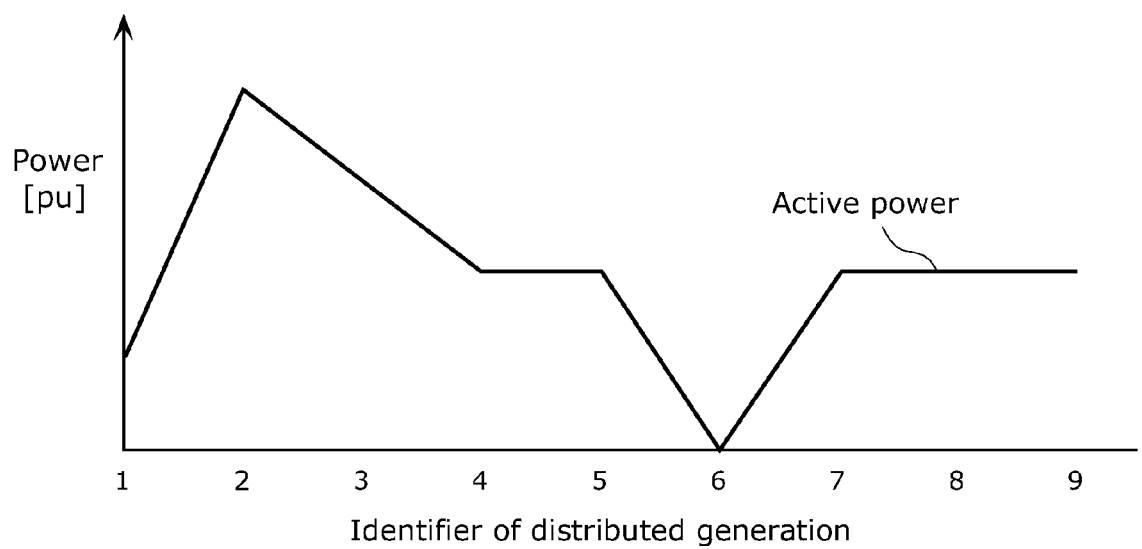
FIG. 7 illustrates the active power output from each distributed generation according to Embodiments 1 and 2.

FIG. 7 is a line graph that that connects values of the active power output from the distributed generations 511 to 519 that are connected as illustrated in FIG. 6 (here, the distributed generation 516 does not output the active power).

In FIG. 7, the vertical axis represents the values of active power, and the horizontal axis represents identifiers of the distributed generations. In other words, the distributed generations 511 to 519 in FIG. 6 correspond to the identifiers 1 to 9 of the distributed generations 520 along the horizontal axis in FIG. 7.

Figure 8:
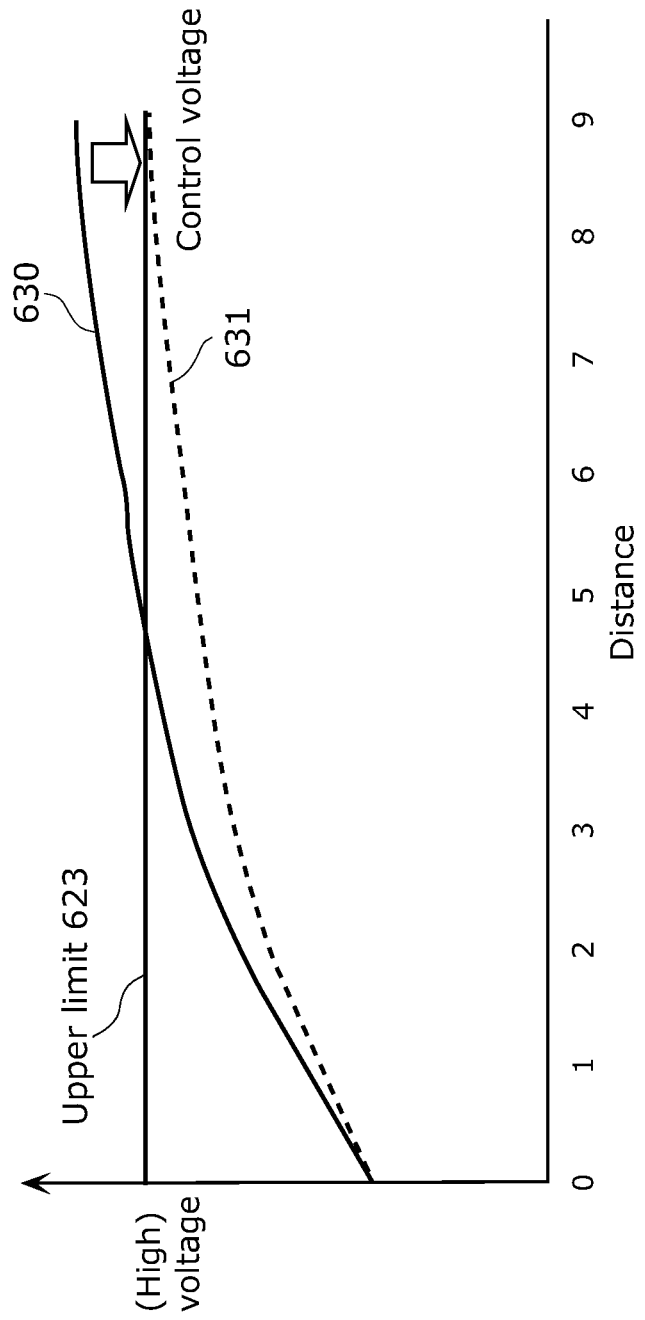
FIG. 8 illustrates voltage distributions of a high-voltage distribution line according to Embodiments 1 and 2.

A voltage distribution 630 in FIG. 8 is a voltage distribution of the high-voltage distribution line 102 when the distributed generations 511 to 519 output power as illustrated in FIG. 7. Furthermore, an upper limit 623 in FIG. 8 is an upper threshold of the proper range of the points of common coupling 610. Furthermore, a controlled voltage distribution 631 in FIG. 8 is a voltage distribution after controlling the voltage using the voltage control apparatus 202 according to the present invention.

The vertical axis in FIG. 8 indicates values of voltages. Furthermore, the horizontal axis in FIG. 8 indicates distances from the distribution substation 101. As described above, the distributed generations 511 to 519 are placed at positions at the distances 1 to 9, respectively, from the distribution substation 101. Thus, the voltage values at the horizontal axes 1 to 9 in FIG. 8 are voltage values at the points of common coupling 601 to 609 of the distributed generations 511 to 519, respectively. Here, the distribution substation 101 is at the distance 0.

As indicated by the voltage distribution 630 in FIG. 8, the voltage values at the points of common coupling 605 to 609 of the distributed generations 515 to 519 deviate from the upper limit 623 (for example, 7000 V) of the proper range. Furthermore, the voltage deviation amount at the point of common coupling 609 is the largest.

When the PCC identifying unit 307 identifies one of the points of common coupling 610 at which the voltage is to be controlled, according to a method of identifying the point of common coupling 610 having the largest voltage deviation amount, the distributed generations 520 control the voltage at the point of common coupling 609.

Here, the amount of voltage drop caused by the reactive power output from each of the distributed generations 511 to 519, at the point of common coupling 609 of the distributed generation 519 is calculated using Equation 1.

Let "1 pu" be the transmission voltage $V_0$ of the transformer in the distribution substation 101, Equation 3 represents an amount of change in voltage $\Delta V$ at the point of common coupling 609, due to the variation in the reactive power output from each of the distributed generations 511 to 519 according to Equation 1.

[Math 3]

$$\Delta V = -\left(\sum_{m=1}^{9} xd_m \Delta Q_m\right) \quad \text{(Equation 3)}$$

Next, the load of outputting the reactive power from each of the distributed generations 511 to 519 is calculated using Equation 2.

For example, let 1 be the identifier k of the distributed generation 520 that is a standard distributed generation, that is, when the active power P1 output from the distributed generation 511 is the standard, Equation 4 represents the output value of the reactive power from each of the distributed generations 511 to 519 according to Equation 2. In other words, as the output value of the active power output from the distributed generation 520 is larger, the control variable calculating unit 303 calculates a larger control variable.

[Math 4]

$$\Delta Q_m = \frac{P_m}{P_1} \times \Delta Q_1 (m = 2, \ldots, 9) \quad \text{(Equation 4)}$$

Next, $\Delta Q_m$ (m=1, ..., 9) is solved using the total nine equations of Equations 3 and 4.

Here, Equation 1 assumes the case where a high-voltage distribution line is a line of a single type. Thus, the distance $d_j$ from the transformer in the distribution substation 101 to the distributed generation 520 is multiplied by a line reactance x that is the standard reactance. However, there will be cases where the high-voltage distribution line is composed of lines of two or more types: a thick distribution line is used as the line closer to the transformer in the distribution substation 101, and a thin distribution line is used at the end of the line.

Thus, the case where the high-voltage distribution line is composed of lines of two or more types can be supported by changing the line reactance portion in Equation 1 as directly determining a line reactance from the transformer in the distribution substation 101 to the own point of common coupling 610 as indicated in Equation 5.

In other words, the control variable calculating unit 303 solves the system of equations of Equation 5 (1 equation) and Equation 6 ((n−1) equations), so as to obtain the amount of change in the reactive power $\Delta Q_j$ output from each of the distributed generations 520. Equation 6 is identical to Equation 2.

Here, $V_0$ denotes a transmission voltage of the transformer in the distribution substation 101. Furthermore, $\Delta V$ denotes a target amount of change in voltage at a corresponding one of the points of common coupling 610 at which the voltage is to be controlled. Furthermore, n denotes the number of the distributed generations 520 that are connected to the high-voltage distribution line 102. Furthermore, i denotes an identifier of the distributed generation 520 that is connected to a corresponding one of the points of common coupling 610 at which the voltage is to be controlled. Furthermore, j denotes an identifier of each of the distributed generations 520, and has values ranging from 1 to n in close order from the distribution substation 101. Here, k denotes an identifier of any one of the n distributed generations 520, and ranges from 1 to n. Furthermore, $x_j$ denotes the line reactance from the transformer in the distribution substation 101 to each of the distributed generations 520 identified by j. Furthermore, $\Delta Q_j$ denotes the amount of change in the reactive power output from each of the distributed generations 520 identified by j. Furthermore, $P_j$ denotes the active power output from each of the distributed generations 520 identified by the identifier j.

Let a gain be an impedance with a smaller value min ($x_j$, $x_i$)) out of the system impedance "$x_j$" from the distribution substation 101 to the distributed generation 120 and the system impedance "$x_i$" from the distribution substation 101 to the identified point of common coupling 210, the control variable $\Delta Q_j$ is calculated in Equation 5 by multiplying the gain by the amounts of change in the reactive power $\Delta Q_j$ output from the n distributed generations 120. In other words, as the distributed generation has the larger gain, the amount of the voltage drop at the point of common coupling 210 becomes larger according to the increase in the reactive power to be output.

Furthermore, Equation 5 is calculated so that the control variable $\Delta Q_j$ is larger in proportion to the transmission voltage $V_0$ at the distribution substation 101.

[Math 5]

$$\Delta V = -\frac{1}{V_0}\sum_{j=1}^{n} \min(x_j, x_i) \cdot \Delta Q_j \quad \text{(Equation 5)}$$

[Math 6]

$$\Delta Q_j = \frac{P_j}{P_k} \times \Delta Q_k (j=1,\ldots,n, j \neq k) \quad \text{(Equation 6)}$$

Finally, the control variable calculating unit 303 determines the load of outputting the reactive power (S411), and transmits the determined load of outputting the reactive power to the grid-connected inverter 301 included in each of the distributed generations 520, as a command value. Each of the grid-connected inverters 301 outputs the reactive power based on the command value (S412).

Figure 9:
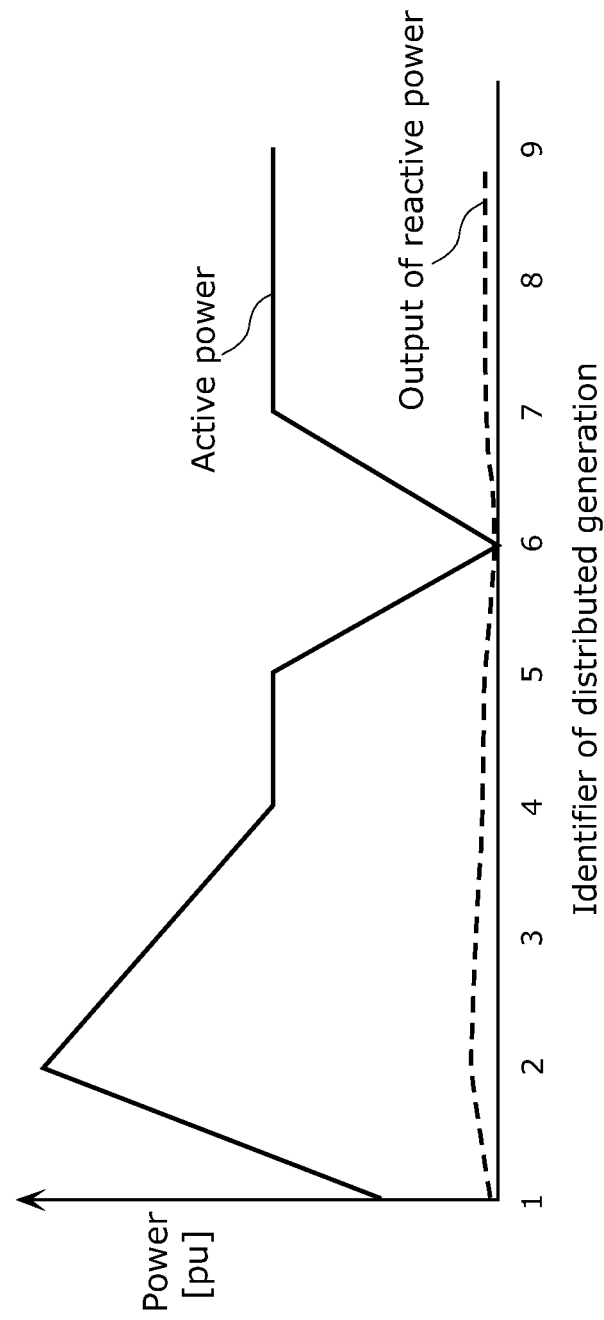
FIG. 9 illustrates the active power and the reactive power (variation) output from each distributed generation according to Embodiments 1 and 2.

FIG. 9 is a line graph that that connects the amounts of change (increase) in the reactive power output from the distributed generations 511 to 519 based on the command value received from the control variable calculating unit 303, and the active power output from each of the distributed generations 511 to 519. The vertical axis and the horizontal axis are the same as those in FIG. 7.

The solid line of FIG. 9 represents the active power output from each of the distributed generations 511 to 519. According to Embodiment 1, the output values of the active power remain unchanged, and are the same values as those in FIG. 7. Furthermore, the broken line of FIG. 9 represents the reactive power output from each of the distributed generations 511 to 519. FIG. 9 indicates a larger amount of change in the output of the reactive power represented by the broken line as the active power represented by the solid line is larger.

Furthermore, the controlled voltage distribution 631 in FIG. 8 indicates that the voltage value is set to an appropriate value with measures to the minimum necessary.

The processes performed by the control variable calculating unit 303 (S410 to S412) when the power factor is equal to or larger than the appropriate value (No at S409 in FIG. 5) are hereinbefore described with reference to FIG. 5.

When the power factor falls below the appropriate value (Yes at S409 in FIG. 5), the output value of the reactive power cannot be increased any more. Thus, the control variable calculating unit 303 controls the voltage by suppressing the active power (S413 to S415).

More specifically, when the power factor falls below the appropriate value (for example, 85%), the control variable calculating unit 303 calculates, using Equation 7, an amount of voltage drop caused by the active power suppressed by each of the distributed generations 520, at a corresponding one of the points of common coupling 610 at which the voltage is to be controlled (S413).

Here, $V_0$ denotes a transmission voltage of the transformer in the distribution substation 101. Furthermore, $\Delta V$ denotes a target amount of change in voltage at the point of common coupling 610 at which the voltage is to be controlled. Furthermore, n denotes the number of the distributed generations 520 that are connected to the high-voltage distribution line 102. Furthermore, i denotes an identifier of the distributed generation 520 that is connected to the point of common coupling 610 at which the voltage is to be controlled. Furthermore, j denotes an identifier of each of the distributed generations 520, and has values ranging from 1 to n in close order from the distribution substation 101. Furthermore, $d_j$ denotes a distance from the transformer in the distribution substation 101 to each of the distributed generations 120 identified by j. Furthermore, r denotes a value of a line resistance per unit length, and a system impedance from the transformer in the distribution substation 101 to each of the distributed generations 120 identified by j is calculated using r and $d_j$. Furthermore, $\Delta P_j$ denotes the amount of change in the active power output from the distributed generations 520 identified by the identifier j (assuming the active power output from the distributed generations 520 as phase lead). In other words, $\Delta P_j$ represents the control variable of each of the distributed generations 120 calculated by the control variable calculating unit 303.

In other words, Equation 7 is an equation for determining the amount of change in voltage $\Delta V$ at the point of common coupling 610 due to the output variation in the active power output from each of the distributed generations 520. Here, the amount of change in voltage $\Delta V$ is determined so that the voltage at the point of common coupling at which the voltage is to be controlled falls below the variable upper limit. In other words, $\Delta V$=((variable upper limit)−(voltage value at the point of common coupling at which the voltage is to be controlled)−α), where a is any real number equal to or larger than 0.

Let a gain be an impedance with a smaller value (min($rd_j$, $rd_i$)) out of the system impedance "$r \times d_j$" from the distribution substation 101 to the distributed generation 120 and the system impedance "$r \times d_i$" from the distribution substation 101 to the identified point of common coupling 210, the control variable $\Delta P_j$ is calculated in Equation 7 by multiplying the gain by the amount of change in the active power $\Delta P_j$ output from the n distributed generations. In other words, as the distributed generation has a larger gain, the amount of the voltage drop at the point of common coupling 210 becomes larger according to the decrease in the active power to be output.

Furthermore, Equation 7 is calculated so that the control variable $\Delta P_j$ is larger in proportion to the transmission voltage $V_0$ at the distribution substation 101.

Next, the load of suppressing the active power is calculated using Equation 8 (S414).

Here, k denotes an identifier of any one of the n distributed generations 520, and ranges from 1 to n. Furthermore, $P_j$ denotes the active power output from the distributed generations 520 identified by the identifier j.

In other words, let k be the identifier of one of the distributed generations 520 that is arbitrarily selected, Equation 8 is an equation for determining the amount of change in the active power $\Delta P_j$ output from the distributed generation 520 identified by k, using the output value of the active power $P_k$ output from the distributed generation 520 and the amount of change in the active power $\Delta P_k$ output from the distributed generation 520.

In Equation 8, the control variable calculating unit 303 compares the output value of the active power $P_j$ output from the first distributed generation with the output value of the active power $P_k$ output from the second distributed generation, among the n distributed generations, and calculates the control variable $\Delta P_j$ to be notified to the first distributed generation to be larger than the control variable $\Delta P_k$ to be notified to the second distributed generation when the output value of the active power $P_j$ output from the first distributed generation is larger than the output value of the active power $P_k$ output from the second distributed generation ($P_j/P_k > 1$).

Here, Equation 8 is composed of (n−1) equations. The control variable calculating unit 303 solves the system of equations of Equation 7 (1 equation) and Equation 8 ((n−1) equations), so as to obtain the load of suppressing the active power $\Delta P_j$ output from each of the n distributed generations 520.

[Math 7]

$$\Delta V = \frac{r}{V_0} \sum_{j=1}^{n} \min(d_j, d_i) \cdot \Delta P_j \quad \text{(Equation 7)}$$

[Math 8]

$$\Delta P_j = \frac{P_j}{P_k} \times \Delta P_k \, (j=1, \ldots, n, \, j \neq k) \quad \text{(Equation 8)}$$

Next, the processes performed by the control variable calculating unit 303 (S413 and S414) will be specifically described with reference to FIGS. 6, and 10 to 12.

Figure 10:
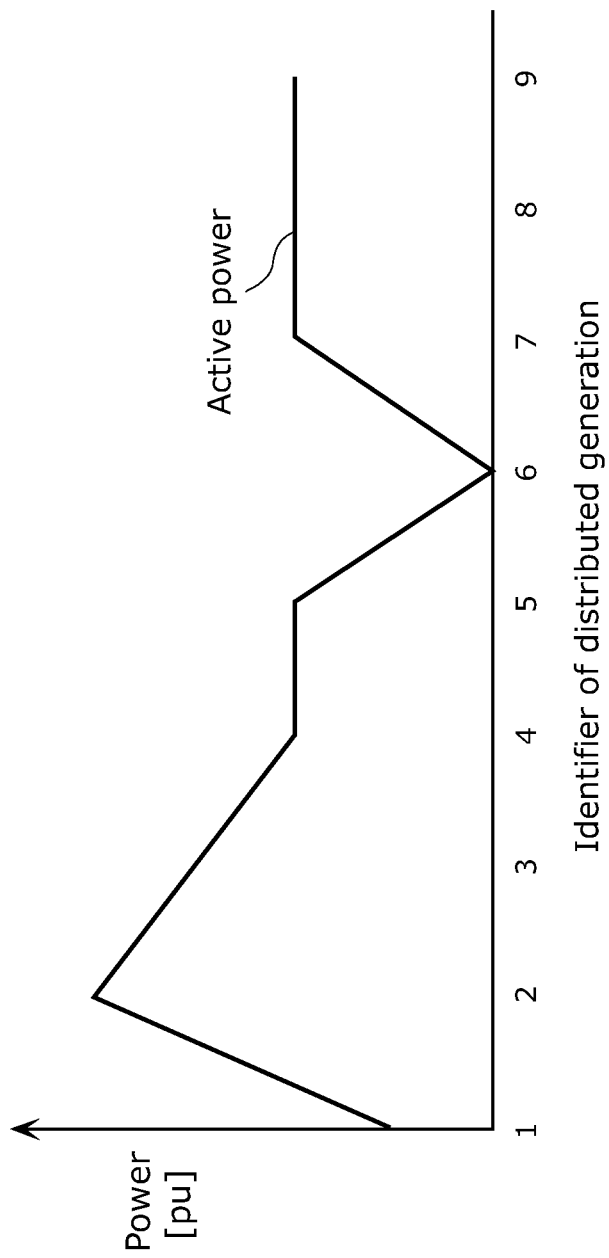
FIG. 10 illustrates the active power output from each distributed generation according to Embodiments 1 and 2.

FIG. 10 is a line graph that connects values of the active power output from the distributed generations 511 to 519 as illustrated in FIG. 6 (here, the distributed generation 516 does not output the active power).

In FIG. 10, the vertical axis represents the values of active power, and the horizontal axis represents identifiers of the distributed generations. In other words, the distributed generations 511 to 519 in FIG. 6 correspond to the identifiers 1 to 9 of the distributed generations 520 along the horizontal axis in FIG. 10.

Figure 11:
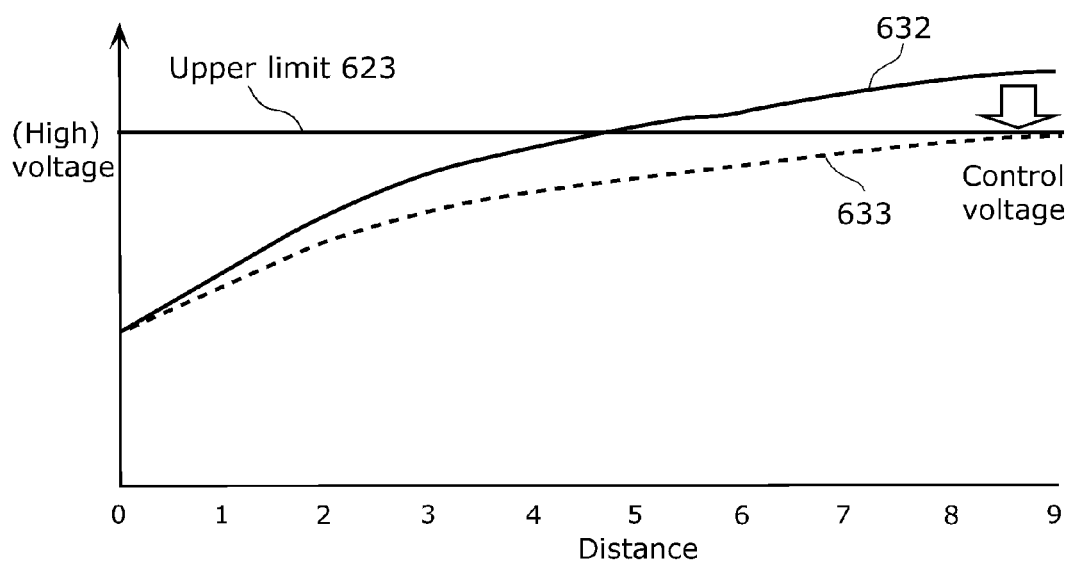
FIG. 11 illustrates voltage distributions of a high-voltage distribution line according to Embodiments 1 and 2.

FIG. 11 illustrates a voltage distribution 632 of the high-voltage distribution line 102 when the distributed generations 511 to 519 output power as illustrated in FIG. 10. FIG. 11 also illustrates the upper limit 623 at the points of common coupling 610. Furthermore, FIG. 11 illustrates a controlled voltage distribution 633 using the voltage control apparatus 202 according to the present invention.

The vertical axis in FIG. 11 indicates values of voltages. Furthermore, the horizontal axis in FIG. 11 indicates distances from the distribution substation 101. As described above for FIG. 6, the distributed generations 511 to 519 are placed at the distances 1 to 9, respectively, from the distribution substation 101. Thus, the voltage values at the horizontal axes 1 to 9 in FIG. 11 are voltage values at the points of common coupling 601 to 609 of the distributed generations 511 to 519, respectively. Here, the distribution substation 101 is at the distance 0.

As indicated by the voltage distribution 632 in FIG. 11, the voltage values at the points of common coupling 605 to 609 of the distributed generations 515 to 519 deviate from the upper limit 623 (for example, 7000 V) of the proper range. Furthermore, the voltage deviation amount at the point of common coupling 609 is the largest.

When the PCC identifying unit 307 identifies one of the points of common coupling 610 at which the voltage is to be controlled, according to a method of identifying the point of common coupling 610 having the largest voltage deviation amount, the distributed generations 520 control the voltage at the point of common coupling 609.

Here, the amount of voltage drop caused by the active power suppressed by each of the distributed generations 511 to 519, at the point of common coupling 609 of the distributed generation 519 is calculated using Equation 7.

Let "1 pu" be the transmission voltage $V_0$ of the transformer in the distribution substation 101, Equation 9 represents an amount of change in voltage $\Delta V$ at the point of common coupling 609, due to the output variation in the active power output from each of the distributed generations 511 to 519 according to Equation 7.

[Math 9]

$$\Delta V = \sum_{m=1}^{9} r d_m \Delta P_m \quad \text{(Equation 9)}$$

Next, the load of suppressing the active power by each of the distributed generations 511 to 519 is calculated using Equation 8. For example, let 1 be the identifier k of the distributed generation 520 that is a standard distributed generation, that is, when the active power $P_1$ output from the distributed generation 511 is the standard, Equation 10 represents the load of suppressing the active power by each of the distributed generations 511 to 519, with respect to the active power $P_1$, according to Equation 8.

[Math 10]

$$\Delta P_m = \frac{P_m}{P_1} \times \Delta P_1 \, (m=2, \ldots, 9) \quad \text{(Equation 10)}$$

Next, $\Delta P_m$ (m=1, . . . , 9) is solved using the total nine equations of Equations 9 and 10.

Here, Equation 7 assumes the case where a high-voltage distribution line is a line of a single type, as the calculation of the load of outputting the reactive power (S410, S411). Thus, the case where the high-voltage distribution line is composed of lines of two or more types can be supported by changing the line resistance r in Equation 7 as directly determining a line resistance from the transformer in the distribution substation 101 to the own point of common coupling 610 as indicated in Equation 11.

[Math 11]

$$\Delta V = \frac{1}{V_0} \sum_{j=1}^{n} \min(r_j, r_i) \cdot \Delta P_j \qquad \text{(Equation 11)}$$

[Math 12]

$$\Delta P_j = \frac{P_j}{P_k} \times \Delta P_k (j = 1, \ldots, n, j \neq k) \qquad \text{(Equation 12)}$$

Here, $V_0$ denotes a transmission voltage of the transformer in the distribution substation 101. Furthermore, $\Delta V$ denotes a target amount of change in voltage at the point of common coupling 610 at which the voltage is to be controlled. Furthermore, n denotes the number of the distributed generations 520 that are connected to the high-voltage distribution line 102. Furthermore, i denotes an identifier of the distributed generation 520 that is connected to the point of common coupling 610 at which the voltage is to be controlled. Furthermore, j denotes an identifier of each of the distributed generations 520, and has values ranging from 1 to n in close order from the distribution substation 101. Here, k denotes an identifier of any one of the n distributed generations 520, and ranges from 1 to n. Furthermore, $r_j$ denotes a line resistance from the transformer in the distribution substation 101 to each of the distributed generations 520 identified by j. Furthermore, $\Delta P_j$ denotes the amount of change in the active power output from the distributed generations 520 identified by j. Furthermore, $P_j$ denotes the active power output from the distributed generations 520 identified by the identifier j.

Let a gain be an impedance with a smaller value ($\min(r_j, r_i)$) out of the system impedance "$r_j$" from the distribution substation 101 to the distributed generation 120 and the system impedance "$r_i$" from the distribution substation 101 to the identified point of common coupling 210, the change in the active power $\Delta P_j$ is calculated in Equation 11 by multiplying the gain by the amount of change in the active power $\Delta P_j$ output from the n distributed generations. In other words, as the distributed generation has a larger gain, the amount of the voltage drop at the point of common coupling 210 becomes larger according to the decrease in the active power to be output.

Furthermore, Equation 11 is calculated so that the control variable $\Delta P_j$ is larger in proportion to the transmission voltage $V_0$ at the distribution substation 101.

The control variable calculating unit 303 solves the system of equations of Equation 11 (1 equation) and Equation 12 ((n−1) equations), so as to obtain the amount of change in the active power $\Delta P_j$ suppressed by each of the distributed generations 520. Equation 12 is identical to Equation 8.

Finally, the control variable calculating unit 303 transmits the determined load of suppressing the active power (S414) to the grid-connected inverter 301 included in each of the distributed generations 520, as a command value. Then, the grid-connected inverter 301 suppresses the active power based on the command value for controlling the voltage (S415).

Figure 12:
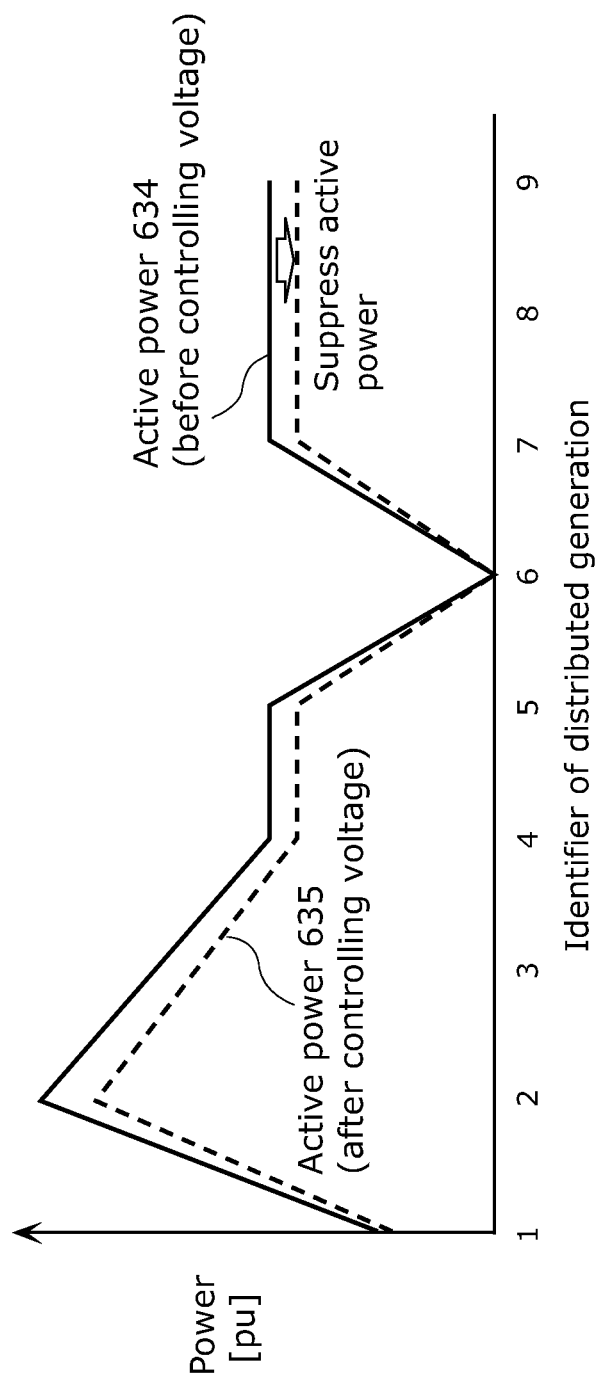
FIG. 12 illustrates the active power output from each distributed generation (before and after controlling a voltage) according to Embodiments 1 and 2.

FIG. 12 illustrates a line graph indicating values of the active power before controlling a voltage 634, and a line graph indicating values of the active power after controlling a voltage 635. The voltage is output from each of the distributed generations 511 to 519. The vertical axis and the horizontal axis are the same as those in FIG. 10.

FIG. 12 indicates a larger amount of change (decrease) in the output of the active power as the active power before controlling the voltage is larger.

Furthermore, the controlled voltage distribution 633 in FIG. 11 indicates that the voltage value is set to the appropriate value with the measures to the minimum necessary.

After completion of the processes of outputting the reactive power (S412) or suppressing the active power (S415), the voltage control apparatus 202 returns to the process of obtaining the local information by the local information obtaining unit 309 (S403 in FIG. 4), and the subsequent processes are repeated.

Although the system information is handled as a static parameter in Embodiment 1, it is possible to configure the voltage control apparatus 202 to return to the process of obtaining the system information by the second information obtaining unit 305 (S401), after completion of the processes of outputting the reactive power (S412) or suppressing the active power (S415) (not illustrated).

Furthermore, when the control variable calculating unit 303 obtains information on changes in the system information from a server managed by an electric power company or the other distributed generations 520, it is possible to process the information by returning to the process of obtaining the system information by the second information obtaining unit 305 (S401), not proceeding to the process of obtaining the local information by the local information obtaining unit 309 (S403) (not illustrated).

As described above, the voltage control apparatus 202 according to Embodiment 1 includes: the first information obtaining unit 302 configured to obtain a value of active power that is input and output to and from each of the distributed generations 120 connected to a distribution system, and a voltage value or a voltage deviation amount from a predetermined proper range, at each of points of common coupling 210 of the distributed generations 120; and the control variable calculating unit 303 configured to calculate a control value corresponding to a value of active power or a value of reactive power that is to be input and output to and from each of the distributed generations 120 so that a voltage value at one of the points of common coupling 210 at which a voltage deviates from the predetermined proper range falls within the predetermined proper range; and a notification unit configured to notify the distributed generations 120 of the control values calculated for the respective distributed generations 120.

Furthermore, the control variable calculating unit 303 is configured to calculate the control values so that an amount of change in the value of the active power or the reactive power that is to be input and output to and from each of the distributed generations 120 is larger as the value of the active power obtained by the first information obtaining unit 302 is larger.

The configuration results in the implementation of the voltage control apparatus 202 that equally shares the burden of the reactive power supply and suppresses the output of the active power, regardless of setting positions or uneven distribution of the distributed generations.

Furthermore, the first information obtaining unit 302 may include: the local information obtaining unit 309 configured to obtain the value of the active power that is input and output to and from the first distributed generation 120 included in the distributed generations 120, and the voltage deviation amount or the voltage value at the point of common coupling 210 of the first distributed generation 120; and the communication unit 204 configured to (i) transmit, to the second distributed generation 120 included in the distributed generations 120, the value of the active power that is input and output to and from the first distributed generation 120, and the voltage deviation amount or the voltage value at the point of common coupling 210 of the first distributed generation 120, and (ii)

receive, from the third distributed generation 120 included in the distributed generations 120, the value of the active power that is input and output to and from the second distributed generation 120, and the voltage deviation amount or the voltage value at the point of common coupling 210 of the second distributed generation 120, the output value, and the voltage deviation amount or the voltage value being obtained by the local information obtaining unit 309 included in the second distributed generation 120.

As a result, the voltage control apparatus 202 according to the present invention can calculate the control variable of the voltage at the identified point of common coupling 210 using (i) output values of the active power output from the other distributed generations 120 that are interconnected to the power system and output from the own distributed generation 120 and (ii) voltage deviation amounts or voltage values at the other distributed generations 120 and the own point of common coupling 210, even when the distributed generation 120 includes the voltage control apparatus 202.

The voltage control apparatus 202 may further include the second information obtaining unit 305 configured to obtain a system impedance to a corresponding one of the distributed generations 120, wherein the control variable calculating unit 303 may be configured to calculate the control values by multiplying, as a gain, a smaller one of the system impedance and a system impedance to the one of the points of common coupling 210 at which the voltage deviates from the predetermined proper range by the amount of change in the value of the active power or the reactive power that is to be input and output between each of the distributed generations 120 and the distribution system.

Since the system impedance is larger and the voltage more easily rises at the point of common coupling 210 that is located at the end of the distribution line and more distant from the distribution substation 101 or the transformer, the voltage control apparatus 202 according to the present invention can solve a problem that the distributed generation 120 located closer to the end of the distribution line has the increased load of the leading reactive power to be supplied and has to increasingly suppress the output of the active power.

Furthermore, the second information obtaining unit 305 may be configured to obtain a transmission voltage of a transformer, and the control variable calculating unit 303 may be configured to calculate the control value so that the control value is larger in proportion to the transmission voltage.

Consequently, as the transmission voltage is larger when the control variable is calculated, a larger control variable is calculated, so that an appropriate control value can be obtained.

Furthermore, the voltage control apparatus 202 may further include a system impedance estimating unit configured to estimate the system impedance to the distributed generation 120, wherein the system impedance estimating unit is configured to inject harmonics to the distribution system, and calculate the system impedance, using a quotient obtained by dividing a harmonic voltage used when the harmonics are injected by a harmonic current of the injected harmonics so as to prevent the system impedance estimating units of the distributed generations from simultaneously calculating respective system impedances.

Here, the system impedance estimating unit may be configured to change an amount of the active power or the reactive power that is output from each of the distributed generations 120, and calculate the system impedance, using a voltage variation according to the changed amount.

Alternatively, the system impedance estimating unit may be configured to inject harmonics to a power line, and calculate the system impedance, using a quotient obtained by dividing a harmonic voltage used when the harmonics are injected by a harmonic current of the injected harmonics.

As a result of these, even when the system impedance is not known in advance and cannot be obtained from the second information obtaining unit, the control variable calculating unit 303 can calculate the voltage control variable.

Furthermore, the system impedance estimating unit may be configured to calculate the system impedance during a time period different for each of the distributed generations so as to prevent the system impedance estimating units of the distributed generations from simultaneously calculating respective system impedances.

Without interference of the processes for estimating the system impedance with one another, the voltage control apparatus 202 can accurately estimate the system impedance.

Furthermore, the voltage control apparatus 202 may further include the PCC identifying unit 307 configured to identify the one of the points of common coupling 210 at which the distributed generations 120 cause respective voltages to fall within the predetermined proper range, the points of common coupling 210 being interconnected to the distributed generations 120, respectively.

Here, the PCC identifying unit 307 may be configured to identify a point of common coupling 210 at which the voltage deviation amount from the predetermined proper range is largest, as the one of the points of common coupling 210 at which the distributed generations 120 cause the respective voltages to fall within the predetermined proper range.

Alternatively, the PCC identifying unit 307 may be configured to identify a point of common coupling 210 at which a voltage value has first deviated from the predetermined proper range, as the one of the points of common coupling 210 at which the distributed generations 120 cause the respective voltages to fall within the predetermined proper range.

Alternatively, the PCC identifying unit 307 may be configured to identify an area that includes a larger number of the points of common coupling 210 at each of which a voltage value deviates from the predetermined proper range, and identify any one of the points of common coupling 210 included in the area, as the one of the points of common coupling 210 at which the distributed generations 120 cause the respective voltages to fall within the predetermined proper range.

As a result of these, even when it is preferable to finish controlling the voltage a smaller number of control times and start controlling the voltage earlier, the point of common coupling 210 at which the voltage is to be controlled can be identified depending on a purpose.

Furthermore, the control variable calculating unit 303 may be configured to calculate the control values so that the voltage deviation amount or the voltage value at the one of the points of common coupling 210 falls within the predetermined proper range, upon deviation of a voltage value at least one of the points of common coupling 210 from the predetermined proper range, and start notifying the distributed generations 120 of the control values.

As a result, after detecting deviation of the voltage value at one of the points of common coupling, the voltage can be controlled immediately.

Although 107 V defined in accordance with the Article 44 of the Electric Utility Industry Law operation rule is used as the variable upper limit of the low voltage in Embodiment 1 (when the standard voltage is 100 V), the variable upper limit may be any, not limited to 107 V. For example, the control may start when the voltage reaches 106 V within the proper range.

Furthermore, a variable upper limit does not have to be uniformly set to all the distributed generations 120. The variable upper limit may be set to different values according to the various conditions, for example, by changing a threshold according to a distance from the distribution substation 101 or the transformer as disclosed in PTL 2.

Although 7000 V is used in Embodiment 1 as the variable upper limit of the high voltage in accordance with the Article 2 of the Ordinance of International Trade & Industry ministry that provides technical requirements for electrical installations, any value may be set to the variable upper limit, not limited to 7000 V. For example, 6992 V may be used in terms of a high voltage as disclosed in PTL 2.

Furthermore, a variable upper limit does not have to be uniformly set to all the distributed generations 520 in the same manner for the low voltage consumers.

When a voltage at a point of common coupling exceeds the variable upper limit or the variable lower limit in determining whether or not the voltage deviates (S404, S902), the processes proceed to the process of controlling the voltage (S405, S903) in Embodiment 1. The processes may proceed to the process of controlling the voltage (S405, S903) after the voltage at the point of common coupling exceeds the variable upper limit or the variable lower limit continuously for a predetermined period.

Furthermore, the voltage at the point of common coupling used in determining whether or not the voltage deviates (S404, S902) may be an instantaneous voltage value, or a voltage value obtained by averaging voltages approximately for more than 3 seconds as recommended in the grid-interconnection code.

Furthermore, although 85% defined in the grid-interconnection code or guideline is used as the appropriate value of the power factor in Embodiment 1, any value may be set to the appropriate value. For example, it is possible to switch to a mode for suppressing the output active power when the voltage falls below 90% or 95%, within the proper range, defined in accordance with ERG83/1 (Great Britain).

Although the voltage control by sharing the output of the reactive power (S410 to S412) and the voltage control by sharing the suppression of output of the active power (S413 to S415) are separately descried in Embodiment 1, these processes can be simultaneously performed. For example, $\Delta P_j$ and $\Delta Q_j$ of each of the distributed generations 120 can be simultaneously determined by determining a ratio of an amount of change in voltage ($\Delta V$) ($\Delta V = \Delta V_q + \Delta V_p$) between the amount of change in voltage due to the output of the reactive power ($\Delta V_q$) and the amount of change in voltage due to the suppression of output of the active power ($\Delta V_p$), and calculating the ratio, and Equations 1 to 2, and 7 to 8. Accordingly, the power factor of each of the distributed generations 120 ($=(P_j+\Delta P_j)/(\sqrt{((P_j+\Delta P_j)^2+(Q_j+\Delta Q_j)^2)})$) can be adjusted. For example, if Yes at the process of determining the power factor at S409, any power factor (for example, 0.85) can be maintained by reducing the output of the reactive power of each of the distributed generations 120 and increasing the suppression of output of the active power. Accordingly, $Q_j$ and $\Delta Q_j$ can be determined so as not to exceed the rated capacity ($\sqrt{((P_j+\Delta P_j)^2+(Q_j+\Delta Q_j)^2)}$) of each of the distributed generations 120.

Although the control variable calculating unit 303 of each of the distributed generations 120 transmits an instantaneous output value of the power generator 203 at regular intervals (for example, at intervals of 10 seconds) to the other distributed generations 120 in Embodiment 1, the control variable calculating unit 303 may calculate an average of the output voltages at transmission intervals (here, average per 10 seconds), and transmit the average.

Instead of transmitting the output value at regular intervals, the control variable calculating unit 303 of the distributed generation 120 that has a voltage over the variable upper limit at the own point of common coupling 210 may transmit an instantaneous output value and a voltage deviation amount or a voltage value of the power generator 203 in the process of transmitting the local information (S405) in FIG. 4. The distributed generation 120 that has a voltage that does not deviate from the variable upper limit may transmit an instantaneous output value of the power generator 203 when receiving the notification that one of the other distributed generation 120 has the voltage over the variable upper limit, from the distributed generation 120 in the process of obtaining information of the other distributed generations 120 (S406).

There are various methods of obtaining information by the second information obtaining unit 305, such as a method of storing the information in the storage unit 304 in advance and a method of obtaining the system information from a server managed by an electric power company or the other distributed generations 120 through the communication unit 204 (not illustrated). Thus, the obtaining methods and the storage positions are not limited to any.

In order to increase the precision, the system impedance estimating unit 306 may perform the estimation processing several times, and use an average of the obtained values.

When the system impedance estimating unit 306 does not use TDMA in estimating a system impedance, the distributed generation that estimates the system impedance may notify the other distributed generations of the start of the estimation. Then, it is possible to prevent the distributed generations that receive the notification from estimating respective impedances for a predetermined period (for example, 100 milliseconds).

In Embodiment 1, the control variable calculating unit 303 performs a blocking wait operation that waits for a predetermined period until the first information obtaining unit 302 receives voltage deviation amounts or voltage values of the other distributed generations (S406). In another embodiment, for example, after the communication unit 204 receives a notification on a voltage deviation amount or a voltage value from one of the other distributed generations, it interrupts the reception by the control variable calculating unit 303. Upon the interruption, the control variable calculating unit 303 starts controlling the voltage (S409).

Embodiment 2

In Embodiment 1, each of the distributed generations 120 calculates an amount of voltage drop and a load of outputting the reactive power (or load of suppressing the active power) at the own point of common coupling 210 at which the voltage is to be controlled.

However, in Embodiment 2 according to the present invention, in the processes of (i) calculating the amount of voltage drop caused by the reactive power (S410) and (ii) calculating the load of outputting the reactive power (S411) (or (i) calculating the amount of voltage drop caused by the active power (S413) and (ii) calculating the load of suppressing the active power (S414)), the number of the distributed generations 120 that calculate the amount of voltage drop and the load of outputting the reactive power (or load of suppressing the active power) at the point of common coupling 210 at which the voltage is to be controlled can be limited to one.

The voltage control apparatus 202 of Embodiment 2 will be specifically described with reference to FIG. 1.

Among the distributed generations 120, the distributed generation 120 that calculates an amount of voltage drop and the load of outputting the reactive power (or load of suppressing the active power) at the point of common coupling 210 at which the voltage is to be controlled is referred to as a distributed generation 108.

Each of the distributed generations 120 other than the distributed generation 108 transmits an output value of active power to the distributed generation 108 at regular intervals (for example, at intervals of 10 seconds). Each of the distributed generations 120 other than the distributed generation 108 determines whether or not the voltage at the own point of common coupling 201 deviates from a variable upper limit (for example, 107 V when the standard voltage is 100 V) at regular intervals (for example, at intervals of one second) (S403 and S404 in FIG. 4).

When the voltage deviates as a result of the determination, each of the distributed generations 120 notifies the distributed generation 108 that is to calculate the voltage control variable, of at least a voltage deviation amount or a voltage value (S405 in FIG. 4).

The distributed generation 108 that receives the notification identifies the point of common coupling 210 at which the voltage is to be controlled (S408 in FIG. 5), and determines whether the reactive power is output or the active power is suppressed to control the voltage (S409 in FIG. 5).

After the determination, the distributed generation 108 calculates an amount of voltage drop and the load of outputting the reactive power (or load of suppressing the active power) at the point of common coupling 210 at which the voltage is to be controlled. Then, the distributed generation 108 transmits the command regarding the output of the reactive power or the active power, to the grid-connected inverter 301 (FIG. 2) included in each of the other distributed generations 120. Each of the grid-connected inverters 301 that receives the command from the distributed generation 108 outputs the reactive power (or suppresses the active power) according to the command value (S412).

When the distributed generation 108 that issues the command controls the voltage at the own point of common coupling 201, the distributed generation 108 calculates the amount of voltage drop and the load of outputting the reactive power (or load of suppressing the active power) at the point of common coupling 201, and transmits the command value to the grid-connected inverter 301 included in the distributed generation 120, without notifying the other distributed generations 120 of the voltage deviation amount or the voltage value.

Each of the distributed generations 120 other than the distributed generation 108 transmits an output value of active power to the distributed generation 108 at regular intervals in Embodiment 2. Instead of such regular transmission, when the distributed generation 108 receives the voltage deviation amount or the voltage value from one of the other distributed generations 120 or only when the voltage at the point of common coupling 201 of the distributed generation 108 deviates from the variable upper limit, the distributed generation 108 that calculates the control variable may issue a command to all the other distributed generations 120 to transmit the output value of active power.

The command value transmitted by the distributed generation 108 that calculates the control variable to the other distributed generations 120 may be an amount of change in the active power or the reactive power ($\Delta P$, $\Delta Q$), or the output value of the active power or the reactive power ($P+\Delta P$, $Q+\Delta Q$).

As described above, according to Embodiment 2, it is possible to implement the voltage control apparatus 202 that equally shares the burden of the reactive power supply and suppresses the output of the active power regardless of the setting positions or uneven distribution of the distributed generations that operate in the coordinated manner, by calculating the control variable for controlling the voltage at the identified point of common coupling using only one of the distributed generations 120, and transmitting the control variable to the other distributed generations 120.

Embodiment 2 is effective, for example, to shorten a period for calculating the control variable using the voltage control apparatus 202 including a CPU at the highest speed, among a plurality of the voltage control apparatuses 202. Furthermore, Embodiment 2 is effective to equally distribute the CPU load to a plurality of the distributed generations 120.

Embodiment 3

Furthermore in Embodiment 3 according to the present invention, one of the voltage control apparatuses 202 that intensively controls the voltage is provided, and it can calculate the amount of voltage drop and the load of outputting the reactive power (or load of suppressing the active power) at the point of common coupling 210 at which the voltage is to be controlled.

Figure 13:
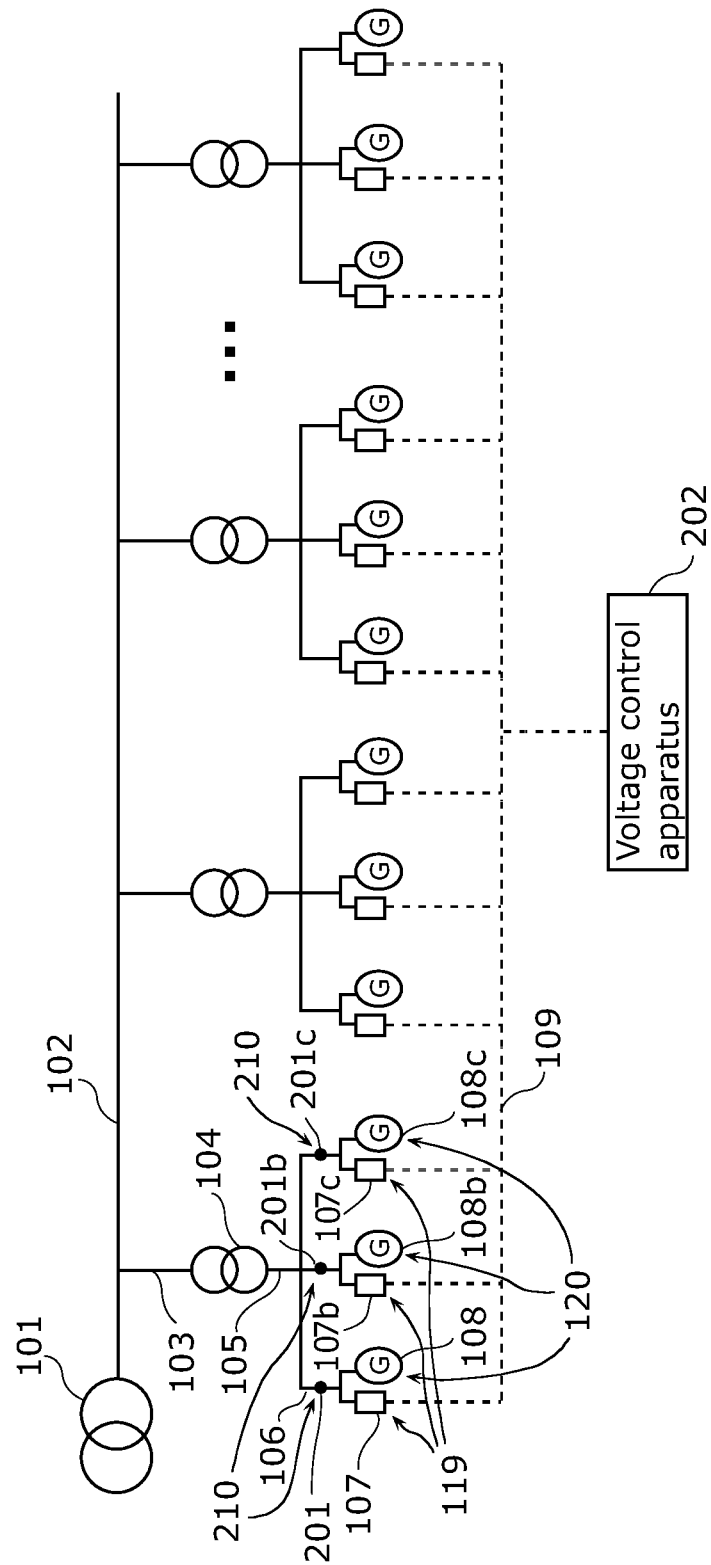
FIG. 13 illustrates a configuration of a distribution system according to Embodiment 3 of the present invention.

FIG. 13 illustrates a configuration of a distribution system (when the voltage control apparatus 202 is provided outside of the distributed generations 120) according to Embodiment 3 of the present invention. In FIG. 13, the same constituent elements as FIG. 1 are denoted by the same reference numerals, and the description thereof is omitted.

Each of the distributed generations 120 transmits an output value of active power to the voltage control apparatus 202 at regular intervals (for example, at intervals of 10 seconds). Each of the distributed generations 120 determines whether or not the voltage at the own point of common coupling 210 deviates from a variable upper limit (for example, 107 V when the standard voltage is 100 V) at regular intervals (for example, at intervals of one second) (S403 and S404 in FIG. 4), and notifies the voltage control apparatus 202 of at least a voltage deviation amount or a voltage value when the voltage deviates (S405).

The voltage control apparatus 202 that receives the notification identifies the point of common coupling 210 at which the voltage is to be controlled (the same process as S408), and determines whether the reactive power is output or the active power is suppressed to control the voltage (the same process as S409).

After the determination, the voltage control apparatus 202 calculates an amount of voltage drop and the load of outputting the reactive power (or load of suppressing the active power) at the point of common coupling 210 at which the voltage is to be controlled, and transmits the command value to all the distributed generations 120. Each of the grid-connected inverters 301 included in the distributed generations 120 that receive the command from the voltage control apparatus 202 outputs the reactive power (or suppresses the active power) according to the command value (S412 or S415).

In Embodiment 3, each of the distributed generations 120 transmits an output value of active power to the voltage control apparatus 202 at regular intervals. Instead of such regular transmission, when the voltage control apparatus 202 receives the voltage deviation amount or the voltage value from at least one of the distributed generations 120, the voltage control apparatus 202 may issue a command to all the distributed generations 120 to transmit the output value of active power.

The command value that the voltage control apparatus 202 transmits to the other distributed generations 120 may be an amount of change in the active power or the reactive power ($\Delta P$, $\Delta Q$), or the output value of the active power or the reactive power ($P+\Delta P$, $Q+\Delta Q$).

In Embodiment 3, since the voltage control apparatus 202 is outside of the distributed generations 120, the voltage control apparatus 202 does not have to be included in the configuration for the distributed generations 120. However, the distributed generations 120 need to have the minimum constituent elements to obtain a control variable using the voltage control apparatus 202 outside.

More specifically, each of the distributed generations 120 needs the local information obtaining unit 309 that obtains the output value of active power output by itself and the voltage deviation amount or the voltage value at the own point of common coupling 210.

Furthermore, each of the distributed generations 120 needs the communication unit 204 that transmits the own output value of active power and the voltage deviation amount or the voltage value that are obtained by the local information obtaining unit 309, to the voltage control apparatus 202 outside that calculates control variables using the obtained information.

Furthermore, the communication unit 204 needs to receive the control variable from the voltage control apparatus 202 outside.

Finally, each of the grid-connected inverters 301 included in the distributed generations 120 needs to change the output value of reactive power or active power to be output from the distributed generation 120, using the control variable received by the communication unit 204 as a target value.

As described above, the first information obtaining unit 302 according to Embodiment 3 includes the communication unit 204 that receives the output value of the active power output from each of the distributed generations 120 and the voltage deviation amount or the voltage value at a corresponding one of the points of common coupling 210 of the distributed generations 120.

As a result, the voltage control apparatus 202 according to the present invention can equally calculate the voltage control variable at the identified point of common coupling 210, using the output value of the active power output from each of the distributed generations 120 that are connected via a wired or wireless communication path, and the voltage deviation amount or the voltage value at each of the points of common coupling 210 of the distributed generations 120.

Furthermore, each of the distributed generations 120 that are interconnected to a distribution system and are used in combination with the voltage control apparatus 202 according to the present invention includes (i) the local information obtaining unit 309 that obtains the output value of the active power output from the distributed generation 120, and the voltage deviation amount or the voltage value at the own point of common coupling 210 of the distributed generation 120 and (ii) the communication unit 204 that transmits the output value of the active power and the voltage deviation amount or the voltage value that are obtained by the local information obtaining unit 309, to the voltage control apparatus 202, and receives a control variable from the voltage control apparatus 202 outside.

In other words, each of the distributed generations 120 does not necessarily have to include the voltage control apparatus 202. Each of the distributed generations 120 can obtain the appropriate control variable, by transmitting the local information and others to at least one of the voltage control apparatuses 202 that is connected to the distributed generations 120 via a wired or wireless network.

Accordingly, there is an advantage of suppressing the cost of the distributed generation 120 installed at each customer.

Embodiment 4

The voltage control apparatus 202 that causes a voltage drop at the point of common coupling when the voltage deviates from the variable upper limit is hereinbefore described. Next, the voltage control apparatus 202 that causes a voltage rise at the point of common coupling will be described hereinafter.

During the voltage control by the voltage control apparatus 202, when the output variation occurs in the distributed generations 120 and the voltage drops, there is a case where the voltage excessively drops. Here, a method performed by the voltage control apparatus 202 for reducing and stopping the voltage control by outputting the reactive power or suppressing the active power will be hereinafter described.

More specifically, during the voltage control, the voltage control apparatus 202 controls a voltage so that the voltage at the point of common coupling 210 at which the voltage is to be controlled approximates a variable lower limit that is a threshold set lower than a variable upper limit, when the voltage at the point of common coupling 210 falls below the variable lower limit.

Figure 14:
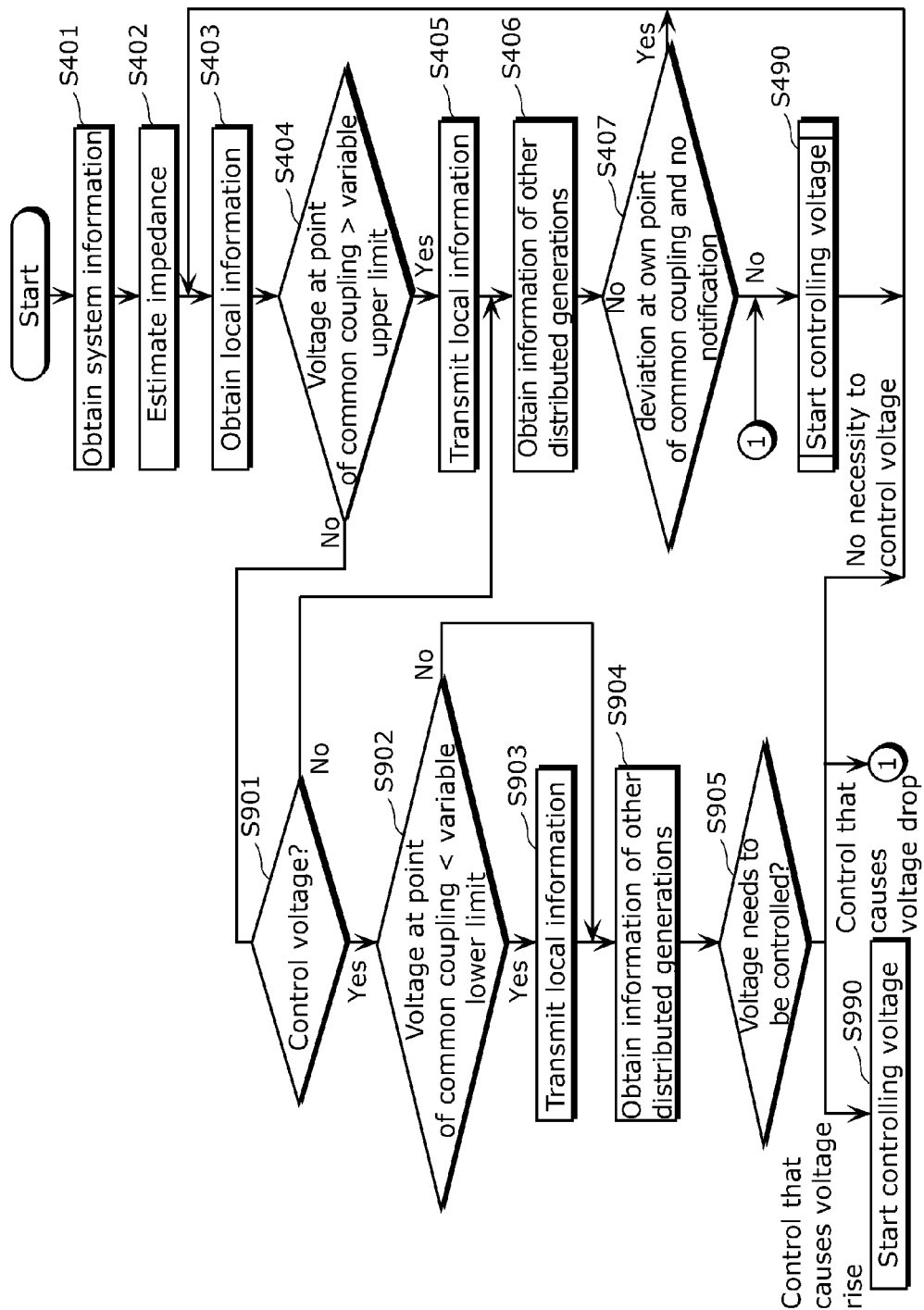
FIG. 14 is a flowchart indicating the procedure of processes performed by a voltage control apparatus according to Embodiment 4 of the present invention.

The voltage control that causes a voltage rise at a point of common coupling and is performed by the voltage control apparatus 202 will be described with reference to the flowchart in FIG. 14. Here, the flowchart in FIG. 14 is obtained by adding the voltage control that causes the voltage rise at the point of common coupling to the flowchart in FIG. 4. The same processes as FIG. 4 are denoted by the same reference numerals, and the description thereof is omitted.

As for the change after adding the voltage control that causes a voltage rise at a point of common coupling, the control variable calculating unit 303 determines whether or not it controls the voltage by outputting the reactive power or suppressing the active power (S901).

When the control variable calculating unit 303 does not control the voltage (No at S901), it obtains information of the other distributed generations 120 from the first information obtaining unit 302 (S406).

When the control variable calculating unit 303 controls the voltage by outputting the reactive power or suppressing the active power (Yes at S901), it determines whether or not the voltage value measured by the local information obtaining unit 309 falls below the variable lower limit (S902).

When the voltage value falls below the variable lower limit as a result of the determination (Yes at S902), the control variable calculating unit 303 notifies the other distributed generations 120 of at least a voltage deviation amount from the variable lower limit or a voltage value, using the communication unit 204 (S903).

When the voltage measured by the local information obtaining unit 309 does not fall below the variable lower limit (No at S902), the control variable calculating unit 303 obtains information of the other distributed generations 120 from the first information obtaining unit 302 (S904).

The control variable calculating unit 303 waits for a predetermined period until it receives the notification on the voltage deviation amount from the variable lower limit or the voltage value from one of the other distributed generations 120. Upon receipt of the notification or after a lapse of the predetermined period, the control variable calculating unit 303 determines whether or not the voltage needs to be controlled (S905).

When the control variable calculating unit 303 receives, from the other distributed generations 120, a notification that the voltage deviates from the variable upper limit due to insufficient control of the voltage, as a result of the determination as to whether or not the voltage needs to be controlled (S905), it determines that control that causes a voltage drop at the point of common coupling (control that causes a voltage drop at S905) is necessary, and proceeds to the process of controlling the voltage (S490).

Furthermore, when the control variable calculating unit 303 determines that the voltage at the own point of common coupling 210 falls below the variable lower limit or receives, from one of the other distributed generations 120, a notification that the voltage falls below the variable lower limit, as a result of the determination as to whether or not the voltage needs to be controlled (S905), it determines that control that causes a voltage rise at the point of common coupling (control that causes a voltage rise at S905) is necessary, and proceeds to the process of controlling the voltage (S990).

Furthermore, when the control variable calculating unit 303 determines that the voltage at the own points of common coupling 210 does not fall below the variable lower limit or does not receive any notification from the other distributed generations 120, as a result of the determination as to whether or not the voltage needs to be controlled (S905), it determines that there is no need to control the voltage (no necessity to control the voltage at S905). As a result, the voltage control apparatus 202 restarts the process of obtaining the local information by the local information obtaining unit 309 (S403).

Figure 15:
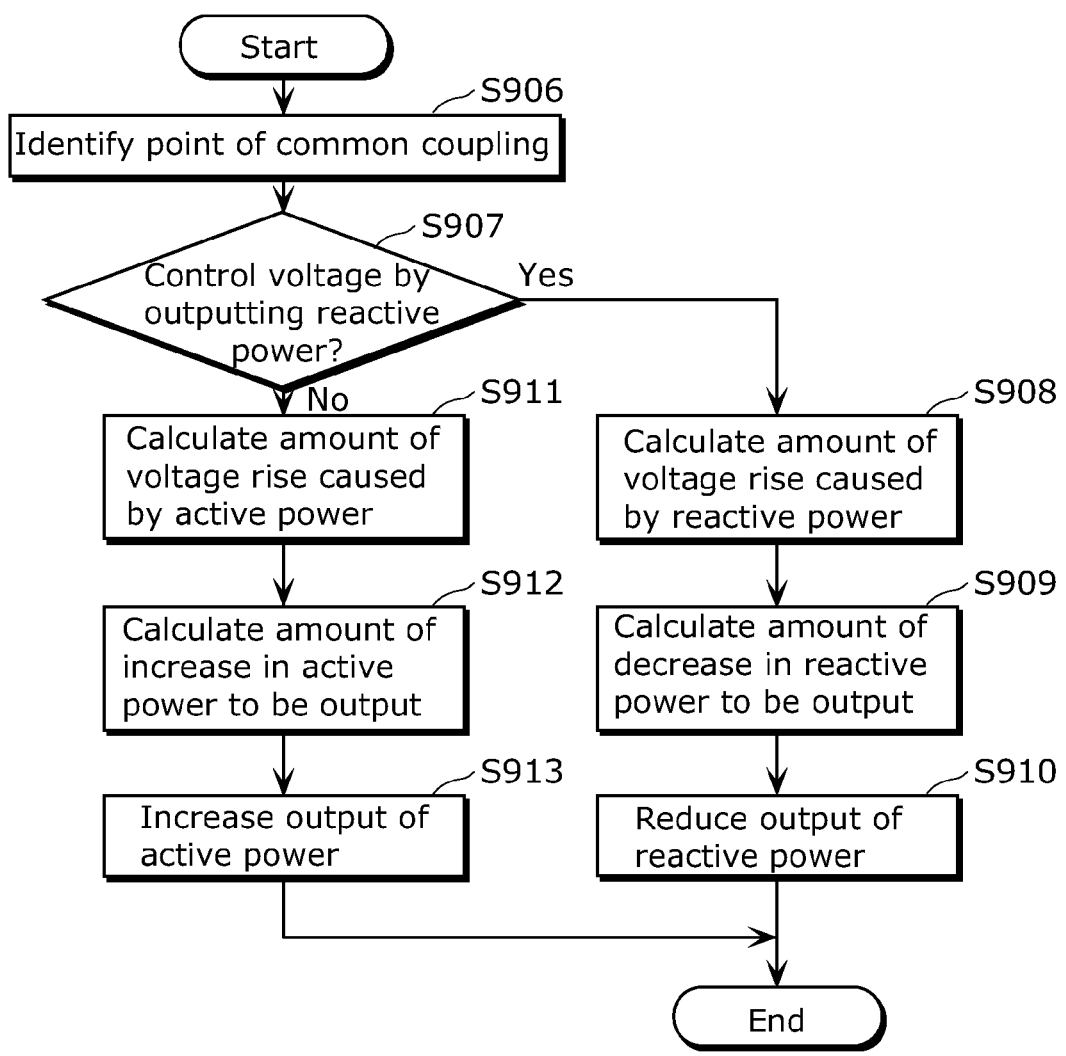
FIG. 15 is a flowchart indicating the procedure of controlling a voltage rise according to Embodiment 4.

FIG. 15 is a flowchart indicating the detailed procedure of the process of controlling a voltage (S990).

The control variable calculating unit 303 identifies one of the points of common coupling 210 at which the voltage is to be controlled (S906), using information on the voltage deviation amounts or the voltage values received from the other distributed generations (S904). One of the identification methods is, but not limited to, the method used in the process of identifying the point of common coupling 210 at which the voltage is to be controlled (S408).

The control variable calculating unit 303 determines whether or not it controls the voltage by outputting the reactive power or suppressing the active power (S907).

When the control variable calculating unit 303 determines that it controls the voltage by outputting the reactive power (Yes at S907), it calculates an amount of the voltage rise at the point of common coupling 210 at which the voltage is to be controlled, due to the reactive power the output of which each of the distributed generations 120 suppresses (S908).

More specifically, the control variable calculating unit 303 calculates the decrease in the reactive power output from each of the distributed generations 120, using Equations 1 and 2 (or Equations 5 and 6), similarly as the process of calculating the amount of voltage drop caused by the reactive power (S410 in FIG. 4) and the process of calculating the load of outputting the reactive power (S411 in FIG. 5).

However, the calculation differs from the process of calculating the amount of voltage drop caused by the reactive power (S410 in FIG. 4) and the process of calculating the load of outputting the reactive power (S411 in FIG. 5) in that the target amount of change in voltage $\Delta V$ at the point of common coupling 210 at which the voltage is to be controlled is expressed by an equation of $\Delta V=((\text{variable lower limit})-(\text{voltage value at the identified point of common coupling at which the voltage is to be controlled})\pm\beta)$, where $\beta$ is any real number equal to or larger than 0.

In other words, the control variable calculating unit 303 calculates a control variable of the reactive power to be smaller so that the voltage value at the point of common coupling 210 at which the voltage is to be controlled approximates a lower limit of a predetermined proper range.

Finally, the control variable calculating unit 303 transmits an amount of decrease in the reactive power to be output that is determined in the process of calculating the load of outputting the reactive power (S909), as a command value, to the grid-connected inverter 301 included in each of the distributed generations 120. Then, the grid-connected inverter 301 reduces the output of the reactive power according to the command value (S910).

When the control variable calculating unit 303 determines that it controls the voltage by suppressing the active power (No at S907), it calculates the amount of the voltage rise at the point of common coupling 210 at which the voltage is to be controlled, due to the increased active power output from each of the distributed generations 120 (S911).

More specifically, the control variable calculating unit 303 calculates the increase in the active power output from each of the distributed generations 120, using Equations 7 and 8 (or Equations 11 and 12), similarly as the process of calculating the amount of the voltage drop caused by the reactive power (S413 in FIG. 4) and the process of calculating the load of suppressing the active power (S414 in FIG. 4).

However, the calculation differs from the process of calculating the amount of voltage drop caused by the reactive power (S413 in FIG. 4) and the process of calculating the load of suppressing the active power (S414 in FIG. 4) in that the target amount of change in voltage $\Delta V$ at the point of common coupling 210 at which the voltage is to be controlled is expressed by an equation of $\Delta V=((\text{variable lower limit})-(\text{voltage value at the identified point of common coupling at which the voltage is to be controlled})\pm\beta)$, where $\beta$ is any real number equal to or larger than 0.

In other words, the control variable calculating unit 303 calculates a control variable of the active power to be smaller so that the voltage value at the point of common coupling 210 at which the voltage is to be controlled approximates a lower limit of a predetermined proper range.

Finally, the control variable calculating unit 303 transmits an amount of increase in the active power to be output that is determined in the process of calculating the increase in the active power to be output (S912) as a command value, to the grid-connected inverter 301 included in each of the distributed generations 120. Then, the grid-connected inverter 301 increases the output of the active power according to the command value (S913).

As described above, the control variable calculating unit 202 may be configured to calculate the control values of the active power or the reactive power to be smaller so that the voltage value at the one of the points of common coupling 210 approximates a lower limit of the predetermined proper range, when (i) the control variable calculating unit 202 calculates the control values for controlling the voltage value at the point of common coupling 210 to be equal to or lower than an upper limit of the predetermined proper range, and (ii) the voltage value at the point of common coupling 210 falls below the lower limit due to a voltage drop as a result of controlling the voltage value.

The configuration results in the appropriate restoration of the voltage drop caused by excessive control of the voltage at the point of common coupling 210 by the voltage control apparatus 202, while the burden of the reactive power supply is equally shared and the output of the active power is equally suppressed regardless of the setting positions or uneven distribution of the distributed generations.

Although the variable lower limit is set lower than the variable upper limit in Embodiment 4, it can be set to the same value as the variable upper limit.

Embodiment 4 is not limited to the case where the voltage at the point of common coupling 210 is set equal to or lower than an appropriate value (for example, 107 V) when the voltage deviates from the appropriate value due to the reverse power flow from the distributed generation 120 as described above. For example, Embodiment 4 is applicable to any cases where a voltage value at a certain point of common coupling is increased or decreased by a certain value.

More specifically, the voltage value at the point of common coupling 210 can be increased by a certain value by substituting $\Delta V=((\text{variable lower limit})-(\text{voltage value at the identified point of common coupling at which the voltage is to be controlled})+\alpha)$ into Equation 1 as the target amount of change in voltage, where a is any real number equal to or larger than 0. When the distributed generation 120 does not generate power, setting not the generated power but the power consumed by the load 119 to the value of P in Equation 2 enables determination of the lagging reactive power to be output, so that each of the distributed generations 120 sets the voltage at a corresponding one of the points of common coupling 210 equal to or larger than the appropriate value, according to the size of the load. The same holds true for suppressing the active power.

Although the control variable calculating unit 303 determines the start of the voltage control (S990) at predetermined intervals in Embodiment 4, the process is not limited to such. For example, when the communication unit 204 receives a notification on a voltage deviation amount or a voltage value from one of the other distributed generations 120, it interrupts the reception by the control variable calculating unit 303. Upon the interruption, the control variable calculating unit 303 may start controlling the voltage (S906 in FIG. 14).

As clarified from above, the voltage control is equally shared by determining output amounts of reactive power and suppressed amounts of active power, according to the output values of the active power from the distributed generations 120 according to the present invention.

In PTL 2, although the output reactive power is determined by using an objective function so as to minimize a sum of the voltage deviation amounts and a sum of the control variables for the distributed generations, still deviation occurs because a sum of squared deviations between a target voltage value and a controlled voltage value is to be minimized. Thus, when the appropriate upper limit is set to the target voltage value, the voltage deviation cannot be suppressed. Alternatively, the voltage is controlled beyond necessity, and the minimum value is not always guaranteed.

In contrast, according to the present invention, the control variables for controlling the output of the reactive power and the active power can be calculated in order to change the voltage value at a certain point of common coupling by a certain value to the minimum necessary in consideration of the amount of change in voltage at the certain point of common coupling due to the voltage control performed by each of the distributed generations. Thus, useless control can be suppressed, and the voltage can be controlled without any power loss.

Figure 16:
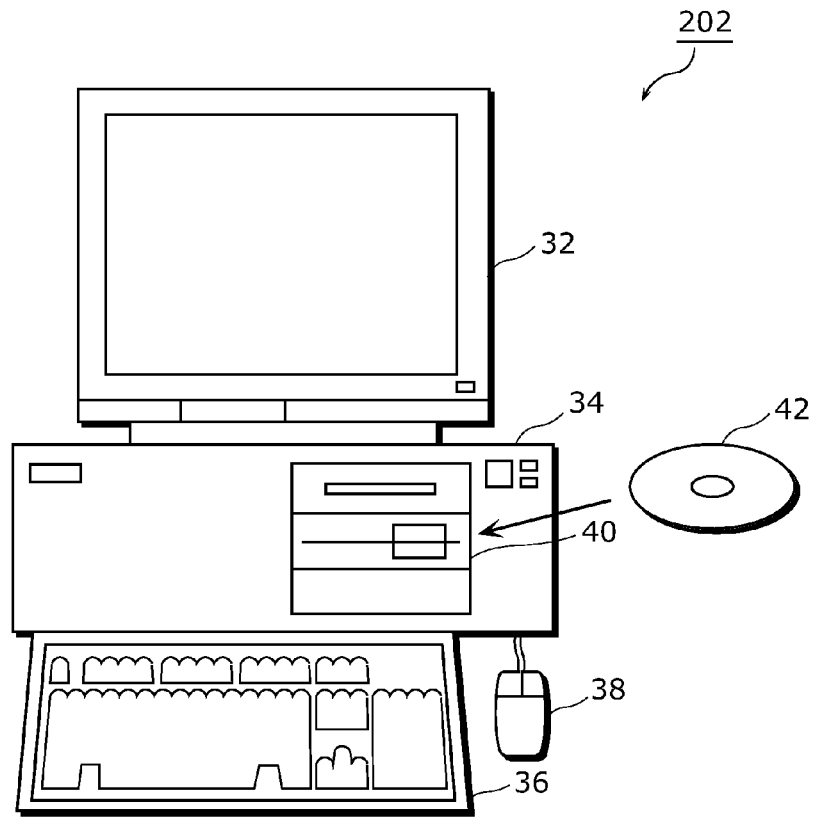
FIG. 16 is an external view illustrating hardware necessary for implementing the voltage control apparatus according to Embodiments 1 to 4.

The voltage control apparatus 202 described in Embodiments 1 to 4 can be implemented by a computer. As illustrated in FIG. 16, the voltage control apparatus 202 includes a computer 34, a keyboard 36 and a mouse 38 for instructing the computer 34, a display 32 for presenting information, such as a result of the computation by the computer 34, a compact disc-read only memory (CD-ROM) device 40 for reading a program executed by the computer 34, and a communication modem (not illustrated).

The program for calculating a control variable output by the voltage control apparatus 202 is stored in a CD-ROM 42 that is a computer-readable medium, and is read by the CD-ROM device 40. Furthermore, the program is read by the communication modem via a computer network.

Figure 17:
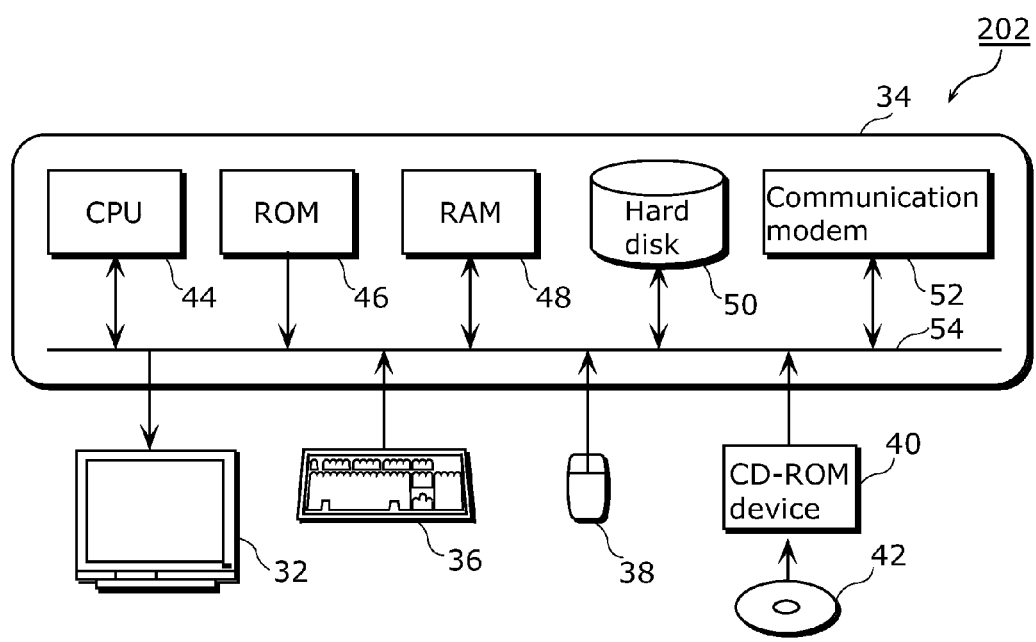
FIG. 17 is a block diagram illustrating a hardware construction necessary for implementing the voltage control apparatus according to Embodiments 1 to 4.

FIG. 17 is a block diagram illustrating a hardware construction of a computer system that implements the voltage control apparatus 202. The computer 34 includes a central processing unit (CPU) 44, a read only memory (ROM) 46, a random access memory (RAM) 48, a hard disk 50, a communication modem 52, and a bus 54.

The CPU 44 executes a program read through the CD-ROM device 40 or the communication modem 52. The ROM 46 stores a program and data necessary for operating the computer 34. The RAM 48 stores data, such as a parameter for executing a program. The hard disk 50 stores a program and data. The communication modem 52 communicates with other computers via the computer network. The bus 54 is interconnected to the CPU 44, the ROM 46, the RAM 48, the hard disk 50, the communication modem 52, the display 32, the keyboard 36, the mouse 38, and the CD-ROM device 40.

A part of or an entire of the constituent elements included in each of the voltage control apparatuses 202 may be configured of a system Large Scale Integration (LSI). The system LSI is a super multi-functional LSI manufactured by integrating the constituent elements into a single chip. More specifically, the system LSI is a computer system including a microprocessor, a ROM, and a RAM. The RAM stores a computer program. The microprocessor operates according to the computer program, so that the system LSI fulfills the functions.

Furthermore, a part or an entire of the constituent elements included in each of the voltage control apparatuses 202 may be configured of an IC card or a single module detachable from the apparatus. The IC card or the module is a computer system including the microprocessor, the ROM, and the RAM. The IC card or the module may include the super multi-functional LSI. The microprocessor operates according to the computer program, so that the IC card or the module fulfills the functions. The IC card or the module may have tamper-resistance.

The present invention may be any of the above methods. Furthermore, the present invention may be a computer program which causes a computer to execute these methods, and a digital signal included in the computer program.

Moreover, in the present invention, the computer program or the digital signal may be recorded on a computer-readable recording medium, for example, a flexible disk, a hard disk, a CD-ROM, an MO, a DVD, a DVD-ROM, a DVD-RAM, a Blu-ray Disc (BD) (R), a memory card, such as a USB memory and an SD card, and a semiconductor memory. Moreover, the present invention may be the digital signal recorded on these recording media.

Furthermore, in the present invention, the computer program or the digital signal may be transmitted via an electronic communication line, a wireless or wired communication line, a network represented by the Internet, data broadcasting, and the like.

Moreover, the present invention may be a computer system including a microprocessor and a memory. The memory may store the computer program, and the microprocessor may operate according to the computer program.

Furthermore, the present invention may execute the computer program or the digital signal in another independent computer system by recording the computer program or the digital signal on the recording medium and transporting the recording medium, or by transmitting the computer program or the digital signal via a network and the like.

Embodiments and modifications may be combined.

Embodiments disclosed this time are exemplifications in all respects, and should be regarded as not limiting the scope of the present invention. The scope is indicated not by the description but by Claims, and is intended to include all the modifications within Claims, meanings of equivalents, and the scope of the equivalents.

INDUSTRIAL APPLICABILITY

The present invention is applicable to a voltage control apparatus that calculates control variables for controlling a voltage of a distribution system interconnected to distributed generations.

| [Reference Signs List] | |
| --- | --- |
| 32 | Display |
| 34 | Computer system |
| 36 | Keyboard |
| 38 | Mouse |
| 40 | CD-ROM device |
| 44 | CPU |
| 46 | ROM |
| 48 | RAM |
| 50 | Hard disk |
| 52 | Communication modem |
| 54 | Bus |
| 100 | Distribution system |

-continued

[Reference Signs List]

| | |
|---|---|
| 101 | Distribution substation |
| 102 | High-voltage distribution line |
| 103 | High-voltage drop wire |
| 104 | Pole-mounted transformer |
| 105 | Low-voltage distribution line |
| 106 | Service wire |
| 107 | Load |
| 107b | Load |
| 107c | Load |
| 108 | Distributed generation |
| 108b | Distributed generation |
| 108c | Distributed generation |
| 109 | Communication line |
| 119 | Load |
| 120 | Distributed generation |
| 201 | Point of Common Coupling (PCC) |
| 201b | Point of Common Coupling (PCC) |
| 201c | Point of Common Coupling (PCC) |
| 202 | Voltage control apparatus |
| 203 | Power generator |
| 204 | Communication unit |
| 210 | Point of Common Coupling (PCC) |
| 301 | Grid-connected inverter |
| 302 | First information obtaining unit |
| 303 | Control variable calculating unit |
| 304 | Storage unit |
| 305 | Second information obtaining unit |
| 306 | System impedance estimating unit |
| 307 | PCC identifying unit |
| 309 | Local information obtaining unit |
| 501 to 509 | Load |
| 510 | Load |
| 511 to 519 | Distributed generation |
| 520 | Distributed generation |
| 551 to 559 | High voltage consumer |
| 601 to 609 | Point of Common Coupling (PCC) |
| 610 | Point of Common Coupling (PCC) |
| 623 | Upper limit |
| 630 | Voltage distribution |
| 631 | Controlled voltage distribution |
| 632 | Voltage distribution |
| 633 | Controlled voltage distribution |
| 634 | Active power before controlling a voltage |
| 635 | Active power after controlling a voltage |

The invention claimed is:

1. A voltage control apparatus comprising:
a first information obtaining unit configured to obtain a value of active power that is input and output to and from each of the distributed generations connected to a distribution system, and a voltage value or a voltage deviation amount from a predetermined proper range, at each of points of common coupling of the distributed generations; and
a control variable calculating unit configured to calculate a control value corresponding to a value of active power or a value of reactive power that is to be input and output to and from each of the distributed generations so that a voltage value at one of the points of common coupling at which a voltage deviates from the predetermined proper range falls within the predetermined proper range; and
a notification unit configured to notify the distributed generations of the control values calculated for the respective distributed generations,
wherein said control variable calculating unit is configured to calculate the control values so that an amount of change in the value of the active power or the reactive power that is to be input and output to and from each of the distributed generations is larger as the value of the active power obtained by said first information obtaining unit is larger.

2. The voltage control apparatus according to claim 1,
wherein said first information obtaining unit includes:
a local information obtaining unit configured to obtain the value of the active power that is input and output to and from a first distributed generation included in the distributed generations, and the voltage deviation amount or the voltage value at the point of common coupling of the first distributed generation; and
a communication unit configured to (i) transmit, to a second distributed generation included in the distributed generations, the value of the active power that is input and output to and from the first distributed generation, and the voltage deviation amount or the voltage value at the point of common coupling of the first distributed generation, and (ii) receive, from a third distributed generation included in the distributed generations, the value of the active power that is input and output to and from the second distributed generation, and the voltage deviation amount or the voltage value at the point of common coupling of the second distributed generation, the output value, and the voltage deviation amount or the voltage value being obtained by said local information obtaining unit included in the second distributed generation.

3. The voltage control apparatus according to claim 1, further comprising
a second information obtaining unit configured to obtain a system impedance to a corresponding one of the distributed generations,
wherein said control variable calculating unit is configured to calculate the control values by multiplying, as a gain, a smaller one of the system impedance and a system impedance to the one of the points of common coupling at which the voltage deviates from the predetermined proper range by the amount of change in the value of the active power or the reactive power that is to be input and output between each of the distributed generations and the distribution system.

4. The voltage control apparatus according to claim 3,
wherein said second information obtaining unit is configured to obtain a transmission voltage of a transformer, and
said control variable calculating unit is configured to calculate the control value so that the control value is larger in proportion to the transmission voltage.

5. The voltage control apparatus according to claim 1, further comprising
a system impedance estimating unit configured to estimate a system impedance to a corresponding one of the distributed generations,
wherein said system impedance estimating unit is configured to inject harmonics to the distribution system, and calculate the system impedance, using a quotient obtained by dividing a harmonic voltage used when the harmonics are injected by a harmonic current of the injected harmonics so as to prevent said system impedance estimating units of the distributed generations from simultaneously calculating respective system impedances.

6. The voltage control apparatus according to claim 1, further comprising
a point of common coupling identifying unit configured to identify the one of the points of common coupling at which the distributed generations cause respective voltages to fall within the predetermined proper range, the points of common coupling being interconnected to the distributed generations, respectively.

7. The voltage control apparatus according to claim 6,
wherein said point of common coupling identifying unit is configured to identify a point of common coupling at which the voltage deviation amount from the predetermined proper range is largest, as the one of the points of common coupling at which the distributed generations cause the respective voltages to fall within the predetermined proper range.

8. The voltage control apparatus according to claim 6, wherein said point of common coupling identifying unit is configured to identify a point of common coupling at which a voltage value has first deviated from the predetermined proper range, as the one of the points of common coupling at which the distributed generations cause the respective voltages to fall within the predetermined proper range.

9. The voltage control apparatus according to claim 6, wherein said point of common coupling identifying unit is configured to identify an area that includes a larger number of the points of common coupling at each of which a voltage value deviates from the predetermined proper range, and identify any one of the points of common coupling included in the area, as the one of the points of common coupling at which the distributed generations cause the respective voltages to fall within the predetermined proper range.

10. The voltage control apparatus according to claim 1, wherein said control variable calculating unit is configured to calculate the control values so that the voltage deviation amount or the voltage value at the one of the points of common coupling falls within the predetermined proper range, upon deviation of a voltage value at least one of the points of common coupling from the predetermined proper range, and start notifying the distributed generations of the control values.

11. The voltage control apparatus according to claim 1, wherein said control variable calculating unit is configured to calculate the control values of the active power or the reactive power to be smaller so that the voltage value at the one of the points of common coupling approximates a lower limit of the predetermined proper range, when (i) said control variable calculating unit calculates the control values for controlling the voltage value at the point of common coupling to be equal to or lower than an upper limit of the predetermined proper range, and (ii) the voltage value at the point of common coupling falls below the lower limit due to a voltage drop as a result of controlling the voltage value.

12. The voltage control apparatus according to claim 1, further comprising
a system impedance estimating unit configured to estimate a system impedance to a corresponding one of the distributed generations,
wherein said system impedance estimating unit is configured to change the value of the active power or the reactive power that is to be input and output to and from the distributed generation, and calculate the system impedance using a voltage variation according to the changed value.

13. A voltage control method for controlling a voltage of a distribution system connected to a plurality of distributed generations, said voltage control method comprising:
obtaining a value of active power that is input and output to and from each of the distributed generations, and a voltage value or a voltage deviation amount from a predetermined proper range, at each of points of common coupling of the distributed generations; and
determining a control value corresponding to a value of active power or a value of reactive power that is to be input and output to and from each of the distributed generations so that a voltage value at one of the points of common coupling at which a voltage deviates from the predetermined proper range falls within the predetermined proper range; and
notifying the distributed generations of the control values determined for the respective distributed generations,
wherein in said determining, the control values are determined so that an amount of change in the value of the active power or the reactive power that is to be input and output to and from each of the distributed generations is larger as the value of the active power obtained in said obtaining is larger.

14. A non-transitory computer-readable recording medium on which a program is recorded, the program causing a computer to execute said voltage control method according to claim 13.

15. An integrated circuit that performs said voltage control method according to claim 13.

16. A distributed generation connected to a distribution system, said distributed generation comprising:
an obtaining unit configured to obtain a value of active power that is input and output to and from said distributed generation, and a voltage deviation amount or a voltage value at a point of common coupling of said distributed generation; and
a communication unit configured to transmit the value of the active power and the voltage deviation amount or the voltage value that are obtained by said obtaining unit, to said voltage control apparatus according to claim 1, and receive a control value from said voltage control apparatus,
wherein said distributed generation changes a value of active power to be input or output or a value of reactive power to be input or output, according to the control value.

* * * * *